(12) United States Patent
Rees et al.

(10) Patent No.: US 7,437,734 B2
(45) Date of Patent: Oct. 14, 2008

(54) PROPAGATING WEB TRANSACTION CONTEXT INTO COMMON OBJECT MODEL (COM) BUSINESS LOGIC COMPONENTS

(75) Inventors: Jeffrey Rees, Concord, MA (US);
Raymond M. Bloom, Arlington, MA (US); Michael P. Cleaves, Rockland, MA (US); Arra E. Avakian, Concord, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 996 days.

(21) Appl. No.: 10/640,625

(22) Filed: Aug. 12, 2003

(65) Prior Publication Data

US 2005/0039190 A1    Feb. 17, 2005

(51) Int. Cl.
*G06F 9/46* (2006.01)
*G06F 9/45* (2006.01)
*G06F 13/12* (2006.01)

(52) U.S. Cl. .................. 719/316; 719/328; 719/330; 717/108; 717/130; 717/131; 710/62; 710/63

(58) Field of Classification Search ......... 717/130–131, 717/108; 719/328–330, 315–316; 710/62–63
See application file for complete search history.

(56) References Cited

U.S. PATENT DOCUMENTS

| | | | |
|---|---|---|---|
| 5,848,274 A | 12/1998 | Hamby et al. | |
| 5,991,705 A | 11/1999 | Klein et al. | |
| 6,003,079 A | 12/1999 | Friedrich et al. | |
| 6,026,237 A | 2/2000 | Berry et al. | |
| 6,041,352 A * | 3/2000 | Burdick et al. | 709/224 |
| 6,108,700 A | 8/2000 | Maccabee et al. | |
| 6,202,036 B1 | 3/2001 | Klein et al. | |
| 6,260,187 B1 | 7/2001 | Cirne | |
| 6,263,491 B1 * | 7/2001 | Hunt | 717/130 |
| 6,298,475 B1 | 10/2001 | Alcorn | |
| 6,314,558 B1 | 11/2001 | Angel et al. | |
| 6,327,700 B1 | 12/2001 | Chen et al. | |
| 6,341,260 B2 | 1/2002 | Klein et al. | |
| 6,349,406 B1 | 2/2002 | Levine et al. | |
| 6,389,491 B1 * | 5/2002 | Jacobson et al. | 710/62 |
| 6,412,020 B1 | 6/2002 | Leach et al. | |
| 6,442,620 B1 * | 8/2002 | Thatte et al. | 719/316 |
| 6,484,129 B2 | 11/2002 | Klein et al. | |
| 6,542,908 B1 | 4/2003 | Ims | |
| 6,560,607 B1 | 5/2003 | Lassesen | |
| 6,587,888 B1 * | 7/2003 | Chieu et al. | 719/313 |
| 6,742,178 B1 | 5/2004 | Berry et al. | |
| 6,748,555 B1 * | 6/2004 | Teegan et al. | 714/38 |

(Continued)

OTHER PUBLICATIONS

Keith Brown. "Building a Lightweight COM Interception Framework Part 1: The Universal Delegator." Microsoft Systems Journal (Jan. 1999).*

(Continued)

*Primary Examiner*—Meng-Ai An
*Assistant Examiner*—Jennifer N To

(57) ABSTRACT

Methods and systems for instrumenting a COM object are disclosed. A request from a client for creating a COM object is intercepted and a wrapper object corresponding to the requested COM object is generated. The wrapper object implements a universal interface with a plurality of virtual functions each indexed by a number corresponding to an index number of a method associated with an interface of the requested COM object.

20 Claims, 28 Drawing Sheets

U.S. PATENT DOCUMENTS

| | | | |
|---|---|---|---|
| 6,772,228 B1 * | 8/2004 | Aragona | 719/316 |
| 6,775,824 B1 | 8/2004 | Osborne et al. | |
| 6,792,460 B2 | 9/2004 | Oulu et al. | |
| 6,917,971 B1 | 7/2005 | Klein | |
| 6,968,538 B2 * | 11/2005 | Rust et al. | 717/108 |
| 7,003,565 B2 | 2/2006 | Hind et al. | |
| 7,346,647 B2 * | 3/2008 | Bodine et al. | 709/201 |
| 2001/0029537 A1 | 10/2001 | Klein | |
| 2002/0199031 A1 * | 12/2002 | Rust et al. | 709/315 |
| 2003/0093772 A1 | 5/2003 | Stephenson | |
| 2003/0120593 A1 | 6/2003 | Bansal et al. | |
| 2003/0135789 A1 | 7/2003 | DeWitt et al. | |
| 2003/0195959 A1 | 10/2003 | Labadie et al. | |
| 2004/0220947 A1 | 11/2004 | Aman et al. | |

OTHER PUBLICATIONS

Michael Dunn. "Introduction to COM—What Is It and How To Use It." The Code Project. Jul. 28, 2000. Accessed Sep. 27, 2006. <http://www.codeproject.com/com/comintro.asp?print=true>.*

Galen C. Hunt and Michael L. Scott. "Intercepting and Instrumenting COM Applications." 5th USENIX Conference on Object-Oriented Technologies and Systems. (1999).*

Mark W. Johnson. "The Application Response Measurement (ARM) API, Version 2." (1997) ARM Working Group. Accessed Sep. 9, 2006.*

Johnston et al., "High-Speed Distributed Data Handling for On-Line Instrumentation Systems", IEEE, 1997, pp. 1-19.*

Hunt et al., "Intercepting and Instrumenting COM Applications", Coots, 1999, pp. 1-15.*

McLaren et al., "Instrumenation and Performance Monitoring of Distributed Systems", IEEE, 1990, pp. 1180-1186.*

Verbowski, "Using COM Objects From Java", Technology Overview, Microsoft, 1999, pp. 1-26.*

Arnold, et al. "Approximating the Calling Context Tree via Sampling" IBM Research Report. Jul. 7, 2000.

Johnson, Mark W. "The Application Response Measurement (ARM) API, Version 2." ARM Working Group, 1997.

Hunt, et al. "Intercepting and Instrumenting COM Applications". 5th USENIX Conference on Object-Oriented Technologies and Systems. 1999.

Dunn, Michael. "Introduction to COM—What it Is and How to Use It." The Code Project. Jul. 28, 2000.

Brown, Keith. "Building a Lightweight COM Interception Framework Part 1: The Universal Delegator." Microsoft Systems Journal. Jan. 1999.

Package gnu.bytecode. <http://sources.redhat.com/kawa/api/gnu/bytecode/package-summary.html>. Accessed Nov. 8, 2006.

Keller, et al. "Supporting The Integration and Evolution of Components Through Binary Component Adaptation". Technical Report TRCS97-15. Sep. 9, 1997.

Jikes Bytecode Toolkit. <http://www.alphaworks.ibm.com/tech/jikesbt>. Posted Mar. 31, 2000. Accessed Nov. 8, 2006.

The Java Object Instrumentation Environment. <http://www.cs.duke.edu/an/joie>. May 1, 2003. Accessed Nov. 8, 2006.

Lee, Han Bok. "BIT: Bytemcode Instrumenting Tool" Thesis submitted to University of Colorado, 1997.

CFPARKSE <http://www.alphaworks.ibm.com/tech.cfparse>. Apr. 30, 1999. Accessed Aug. 15, 2003.

Welcome to the Byte Code Engineering Library. <http://bcel.sourceforge.net>. Apr. 12, 2002. Accessed Nov. 28, 2006.

Harkema, et al., "Performing Monitoring of Java Applications", 2002, ACM, p. 114-127.

Orso, et al., "Visualization of Program-Execution Data for Deployed Software", 2003, ACM, p. 67-76 and p. 211.

Berndl, et al., "Dynamic Profiling and Trace Cache Generation", 2003, IEEE, p. 276-285.

* cited by examiner

FIG. 4

```
public java.lang.Object hookClass (
        java.lang.String classname,        /402
        java.lang.String [] methods,       /404
        java.lang.String [] superclasses,  /406
        java.lang.String [] superinterfaces, /408
        java.lang.StringBuffer getHookArg)  410
```
400

FIG. 5

```
public int hookMethod(
        java.lang.Object classcontext,     /502
        java.lang.String classname,        /504
        java.lang.String methodname,       /506
        java.lang.String [] superinterfaces, /508
        java.lang.StringBuffer defMethodArg) 510
```
500

```
public static final int DO_NOT_HOOK;       /522
public static final int HOOK_NO_ARGS;      /524
public static final int HOOK_WITH_ARGS;    /526
public static final int HOOK_WITH_ARG1;    /528
public static final int HOOK_WITH_ARG1_2;  /530
public static final int HOOK_WITH_ARG2;    532
```
520

FIG. 7

```
    public TradeResult buy(String string, int i)
    {
        Object object;  ─── 728
        Throwable throwable;  ─── 718
        TradeResult tradeResult;
734 ─── if ($BIP$hook = null)
            $BIP$installHook();  ─── 702
726 ─── object=$BIP$hook.methodEntry($BIP$ref_C,$BIP$ref_MO,this,2);
730 ─── if (object!=null)
        {  ─── 708
            $BIP$hook.reportArg(object,$BIP$ref_C,$BIP$ref_MO,1,string);
            $BIP$hook.reportArg(object,$BIP$ref_C,$BIP$ref_MO,2,i);
        }
        try   720 ─── 710   ─── 704
714 {
            tradeResult = $BIP$buy(string, i);
        }                            712
        catch (Throwable throwable) ─── 716
        {
            $BIP$hook.methodException(object,$BIP$ref_C,$BIP$ref_MO,throwable);
            throw throwable;
        }             ─── 706
732 ─── if (object!=null)
            $BIP$hook.methodExit(object,$BIP$ref_C,$BIP$ref_MO,tradeResult);
        return tradeResult;
    }
    ...  ─── 724   ─── 722
    private TradeResult $BIP$buy(String string,int i)
        ... Original, unmodified conents of buy
    }
```

700 (braces enclosing upper block)
701 (braces enclosing lower block)

FIG. 9

```
public java.lang.Object classLoadStart (
        java.lang.String    classname,      ~902
        java.lang.class     classObj,       ~904
        int methods)~906                             } 900 public java.lang.Object defMethod (       ~922
        java.lang.Object    classref,      ~924
        java.lang.String    methodname,    ~924
        java.lang.String    methodkind)~926          } 920 public void classLoadEnd(
        java.lang.Object    classref)~942            } 940
```

FIG. 10

```
public java.lang.Object methodEntry (
        java.lang.Object    classref,      ~1002
        java.lang.Object    methodref,     ~1004
        java.lang.Object    instance,      ~1006
        int args)~1008                               } 1000 public void reportArg (
        java.lang.Object    context,       ~1022
        java.lang.Object    classref,      ~1024
        java.lang.Object    methodref,     ~1026
        int argNumber,                     ~1028
        java.lang.Object    methodArg)~1030          } 1020 public void methodExit (
        java.lang.Object    context,       ~1042
        java.lang.Object    classref,      ~1044
        java.lang.Object    methodref,     ~1046
        java.lang.Object    result)~1048             } 1040
```

FIG. 11

```
public java.lang.Object  methodEntryOneArg(
       java.lang.Object   classref,
       java.lang.Object   methodref,
       java.lang.Object   instance,
       java.lang.Object   selectedArg)    ⎬ 1100
                                  ⎫ 1102
```

```
public void methodException (
       java.lang.Object    context,
       java.lang.Object    classref,
       java.lang.Object    methodref,
       java.lang.Throwable e)             ⎬ 1120
                            ⎭ 1122
```

FIG. 12

```
public static ExecCallback getHook (
       java.lang.String  className,    ⎯ 1202
       java.lang.String  classKind,    ⎯ 1204
       java.lang.String  className,    ⎯ 1206
       java.lang.String  classVersion, ⎯ 1208
       java.lang.String  interfaceVersion) ⎯ 1210
                                                   ⎬ 1200
```

FIG. 13A                                    ← 1300

```
// $Source: /data1/nebula/ccm/jade/ccm/import/arra_jlink/i2/bip/hook/RCS/NullExec?Callback.java,v $
// $Revision: 1.8 $ $Date: 2001/08/28 14:56:29 $ $Author: arav $
package i2.bip.hook;
/** An implementation of the ExecCallback that does nothing.
 * A suitable base class for a custom hook class.
 */
public class NullExecCallback
       // Explicit DoNotHook for BIC testing
       implements ExecCallback. DoNotHook {

// Called at start of class initialization
    // Returns opaque class ref
    public Object classLoadStart(String classname, Class classObj, int methods)
    {
      return null;
    }

// Called once for each instrumented method in the class.
    // Returns opaque method ref
    public Object defMethod(
       Object classref,
       String methodname,
       String methodkind)
    {
      return null;
    }

// End of class initialization instrumentation
    public void classLoadEnd(Object classref) { }

// Called at instrumented method entry.
    public Object methodEntry(
       Object classref,
       Object methodref,
       Object instance,
       int args)
    {
      return null;   // Disables methodExit & reportArg instrumentation
    }

// Called at instrumented method entry when single arg requested.
```

```
public Object methodEntryOneArg(
    Object classref,
    Object methodref,
    Object instance,
    Object selectedArg)
{
    return null;   // Disables methodExit & reportArg instrumentation
} public Object methodEntryOneTwoArg(
    Object classref,
    Object methodref,
    Object instance,
    Object arg1,
    Object arg2)
{
    return null;   // Disables methodExit & reportArg instrumentation
}

// Called at normal instrumented method exit,
// unless returned methodEntry context is null.
public void methodExit(
    Object context,
    Object classref,
    Object methodref,
    Object result) { }

// Overloaded versions of methodExit for primitive return types.
public void methodExit(
    Object context,
    Object classref,
    Object methodref,
    int result) { }        // Covers boolean, byte, char, short, and int
public void methodExit(
    Object context,
    Object classref,
    Object methodref,
    float result) { }
public void methodExit(
    Object context,
    Object classref,
    Object methodref,
```

FIG. 13C

```
    long result) { }
public void methodExit(
    Object context,
    Object classref,
    Object methodref,
    double result) { }
public void methodExit(
    Object context,
    Object classref,
    Object methodref) { }

// Called unconditionally at method exception
public void methodException(
    Object context,
    Object classref,
    Object methodref,
    Throwable e) { }

//-------------------
// Argument reporting
//-------------------

// Called after instrumented method entry, once per arg, if
// argument reporting was instrumented.
public void reportArg(
    Object context,
    Object classref,
    Object methodref,
    int argNumber,        // starts at 1
    Object methodArg)     // The actual argument (reference types)
{
}

// Overloaded versions of reportArg for primitive types.
public void reportArg(
    Object context,
    Object classref,
    Object methodref,
    int argNumber,        // starts at 1
    int methodArg)   // Covers boolean, byte, char, short, and int
{
}
```

```
    public void reportArg(
      Object context,
      Object classref,
      Object methodref,
      int argNumber,      // starts at 1
      float methodArg)
    {
    }
    public void reportArg(
      Object context,
      Object classref,
      Object methodref,
      int argNumber,      // starts at 1
      long methodArg)
    {
    }
    public void reportArg(
      Object context,
      Object classref,
      Object methodref,
      int argNumber,      // starts at 1
      double methodArg)
    {
    }
}   // class NullExecCallback
```

FIG. 14

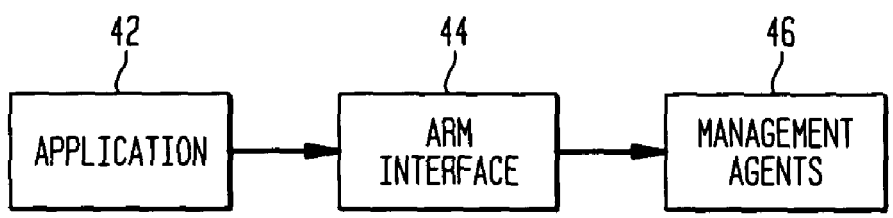

```
PrecallInterceptor UNIVERSAL COM METHOD (METHOD #){
        DETERMINE ARGUMENTS NEEDED FOR METHOD #
        ARM START
        CALL ORIGINAL METHOD #
        ARM STOP
        }
```

```
OVTA CoCreateInstance (A,B,C) {
    .
    .
    .
    CALL CoCreateInstance (A,B,C) {
        .
        .
        .
        ACCESS B
        WRAP OBJECT REFERRED BY B
        SET B TO POINT TO WRAPPER OBJECT
        RETURN TO ORIGINAL CALLER
    }
```

PROPAGATING WEB TRANSACTION CONTEXT INTO COMMON OBJECT MODEL (COM) BUSINESS LOGIC COMPONENTS

RELATED APPLICATIONS

The present application is related to the following commonly owned U.S. patent applications:

U.S. patent application Ser. No. 10/640,620 entitled "USING INTERCEPTORS AND OUT-OF-BAND DATA TO MQNITOR THE PERFORMANCE OF JAVA 2 ENTERPRISE EDITION (J2EE) APPLICATIONS," filed on Aug. 12, 2003;

U.S. patent application Ser. No. 10/640,619 entitled "USE OF THREAD-LOCAL STORAGE TO PROPAGATE APPLICATION CONTEXT IN JAVA 2 ENTERPRISE EDITION (J2EE) APPLICATIONS," filed on Aug. 12. 2003; and U.S. Patent Application Ser. No. 10/640,626 entitled "INSTRUMENTING JAVA CODE BY MODIFYING BYTECODES," filed on Aug. 12, 2003; and U.S. patent application Ser. No. 10/640,623 entitled "SYNTHESIZING APPLICATION RESPONSE MEASUREMENT (ARM) INSTRUMENTATION," filed on Aug. 12, 2003.

BACKGROUND

1. Field of Invention

The present invention relates generally to application performance monitoring and, more particularly, to using interceptors and out-of-band data to monitor the performance of Java 2 enterprise edition (J2EE) applications.

2. Related Art

Recent years have seen a rapid rise in the use of a variety of eBusiness applications. Many business transactions are now routinely performed by utilizing a variety of different applications executing on different platforms connected via computer networks. It is typically desirable to derive performance metrics associated with transactions executed by such applications. For example, obtaining a response time experienced by a user of such an application, e.g., the duration between the start of a user's request and the receipt of the requested information by the user, can provide valuable information regarding the application's efficiency. Further, such performance metrics can be utilized to determine compliance with service level agreements, or to generate alerts when selected metrics exceed pre-defined thresholds. Moreover, it is desirable to isolate and remove bottlenecks that significantly degrade the performance of an application.

In concert with the increased use of eBusiness applications, software architectures for developing them have become more efficient, albeit at the cost of increased architectural complexity. Such architectures typically rely on multiple, dynamically instantiated, and distributed software components to provide highly scalable eBusiness applications. The associated architectural complexity, however, can present significant challenges in developing methods and systems for monitoring transactions performed by the applications Some systems for performing transaction performance monitoring are known in the art. These systems typically suffer from a number of shortcomings that limit their usefulness. For example, some traditional systems rely on source-code modification for providing transaction monitoring. However, source code modification can be cumbersome and time consuming. Further, in some cases, access to an application's source code may not be available.

Thus, there is a need for enhanced systems and methods for monitoring eBusiness transactions. More particularly, there is a need for such enhanced systems and methods that allow monitoring performance of transactions that originate from a computer system and can invoke software components in other computer systems.

SUMMARY OF THE INVENTION

In one aspect of the present invention a method of instrumenting a Common Object Model (COM) object is disclosed. The COM object is invoked by a client for performing a selected business logic. The method comprises intercepting a request from the client for creating the COM object. A wrapper object corresponding to the requested COM object is then generated. The wrapper object implements a universal interface having a plurality of virtual functions each indexed by a number corresponding to an index number of a method associated with an interface of the requested COM object, and the client is provided with a reference pointer to the wrapper COM object. Upon invocation of a method associated with an interface of the requested COM object by the client, a virtual function of the universal interface of the wrapper object, which is indexed by a number corresponding to an index number of the requested method, is invoked. The invoked virtual function references instructions for saving a start time marker, executing instructions corresponding to the requested method, and saving a stop time marker upon completion of execution of the instructions associated with the requested method.

In another aspect of the invention, a system for monitoring a response time of a transaction performed by one or more COM objects executing on one or more platforms is disclosed. The monitoring system comprises a plurality of monitoring agents deployed on selected ones of the platforms. Each monitoring agent intercepts a request for creating at least on of the COM objects, and generates a wrapper object corresponding to the requested COM object. The wrapper object implements a universal interface having a plurality of virtual functions each indexed by a number corresponding to an index number of a method associated with an interface of the COM object.

In a further aspect of the invention, a computer readable medium storing instructions for performing a method of instrumenting a COM object invoked by a client is disclosed. The method comprises intercepting a request from the client for creating the COM object, and generating a wrapper object corresponding to the requested COM object. The wrapper object implements a universal interface having a plurality of virtual functions each indexed by a number corresponding to an index number of a method associated with an interface of the requested COM object. The client is then provided with a reference pointer to the wrapper COM object.

BRIEF DESCRIPTION OF THE DRAWINGS

FIG. 4 illustrates a prototype of an exemplary hookClass method, which can provide a portion of the HookControl interface shown in FIGS. 2 and 3, according to one embodiment of the present invention.

FIG. 5 illustrates a prototype of a hookMethod method, which can provide a portion of the HookControl interface shown in FIGS. 2 and 3, according to one embodiment of the present invention.

FIG. 7 is a listing of an exemplary wrapper method that can be produced by the instrumentation tools of FIGS. 2 and 3.

FIG. 9 illustrates prototypes of exemplary classLoadStart, defMethod and classLoadEnd methods that can be used the plug-in instrument objects of FIGS. 2 and 3, according to one embodiment of the present invention.

FIG. 10 illustrates prototypes of exemplary methodEntry, reportArg and methodExit methods that can be used the plug-in instrument objects of FIGS. 2 and 3, according to one embodiment of the present invention.

FIG. 11 illustrates prototypes of exemplary methodEntryOneArg and methodException methods that can be used the plug-in instrument objects of FIGS. 2 and 3, according to one embodiment of the present invention.

FIG. 12 illustrates a prototype of an exemplary getHook method that can be used the plug-in instrument objects of FIGS. 2 and 3, according to one embodiment of the present invention.

FIGS. 13A-D contain a listing of an exemplary null plug-in instrument class, such as one that could be used with the ExecCallback interfaces of FIG. 2 or 3, according to one embodiment of the present invention.

FIG. 14 schematically illustrates an Application Response Measurement (ARM) interface in communication with an application and management agents.

DETAILED DESCRIPTION

The present invention generally provides methods and systems for end-to-end monitoring of transactions that originate from a computer system, for example, from a user's desktop computer, and can invoke one or more software components in other computer systems, such as, web, application, and database servers. Such transactions typically return data back to the originating computer. For example, the end-to-end transaction can relate to a database query initiated by a web browser, and processed by a number of software components running on various servers providing a chain of communication between the web browser and the database. More particularly, the invention installs transaction monitoring agents on one or more of these servers to monitor performance, for example, time required for execution, of selected methods of a plurality of software components that participate in processing the transactions.

Figure 1:
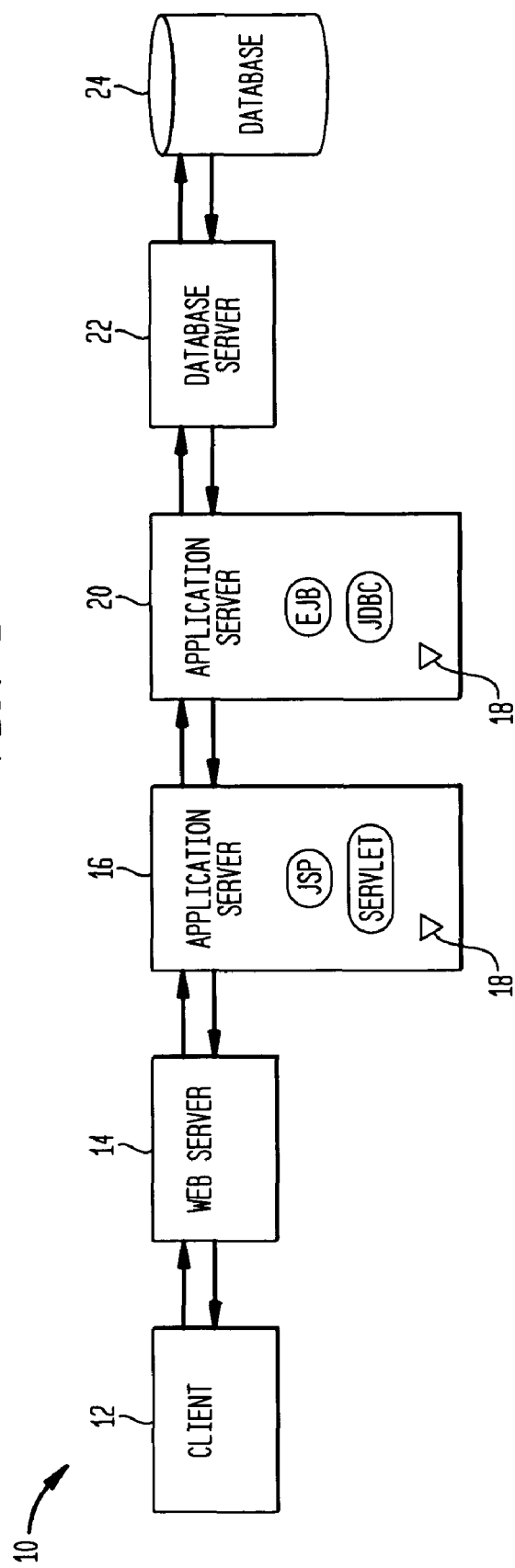
FIG. 1 schematically depicts an exemplary distributed multi-tier Web application architecture in which transaction monitoring agents according to the teachings of the invention are incorporated.

FIG. 1 schematically depicts an exemplary distributed multi-tier Web application architecture 10 in which transaction monitoring agents according to the teachings of the invention are incorporated. The illustrated multi-tier architecture 10 employs a client 12 as an interface for receiving requests from a user. The client 12 can be, for example, a web browser, or alternatively a probe that periodically transmits requests to a web server 14 for testing operations of the system. Without any loss of generality, the client 12 is assumed to be a web browser in the following discussion. The web browser 12 can be running, for example, on a user's desktop, or alternatively, on a PDA or any other suitable platform. The web browser 12 transmits a user's request to a web server 14 that in turn can communicate with an application server 16 that hosts a number of software components, e.g., Java Server Pages (JSPs) or servlets. The exemplary application server 16 also hosts a transaction monitoring agent 18 according to the teachings of the invention that can monitor performance of selected methods in software components invoked on the application server 16 in response to requests received from the web server 14, as discussed in more detail below. The term "transaction," as used herein, refers generally to a method or a function within a software component.

A software component, e.g., a servlet, invoked on the application server 16 may require the services of another application server for performing business logic needed for servicing the request received from the user. In this exemplary embodiment, software components running on the application server 6 can communicate with other software components running on another application server 20. For example, in embodiments in which the application server 16 is a J2EE server, a servlet or a Java Server Page (JSP) running on the application server 16 can invoke an Enterprise Java Bean (EJB) software component hosted on the application server 20 for performing a desired business logic. For example, if the user is utilizing the web server for on-line shopping, the EJB may keep track of items in the user's shopping cart.

Similar to the application server 16, the application server 20 also includes a monitoring agent 18 according to the teachings of the invention that can provide performance analysis of selected methods and/or functions associated with its software components. For example, the transaction monitoring agent 18 can determine the time spent by selected methods associated with these software components for processing a request.

With continued reference to FIG. 1, a software component invoked on the application server 20 may need to communicate with a database server 22 for retrieving data from a database 24. In this example, the data retrieved from the database 24 can be transmitted via the application servers 20 and 16, and the web server 14 to the browser 12 for presentation to the user.

Each of the transaction monitors 18 deployed on various servers participating in processing a transaction can then determine an end-to-end response time associated with selected methods of one or more software components invoked in response to the initiated transaction. Processing a transaction may result in creation of a chain of child-parent transactions in which a parent transaction can spawn a plurality of child transactions, each of which performs a selected task. The transaction monitoring agents of the invention can determine performance metrics, such as response time, associated with each child transaction, and further correlate this performance metric related to a child transaction with its parent, as discussed below.

J2EE Instrumentation

As discussed above, a transaction monitoring system according to the teachings of the invention can include an instrumentation engine that can be utilized for instrumenting selected methods and/or functions associated with software components hosted, for example, on application servers employed in a multi-tier Web architecture. Java-based applications constitute one category of such software components whose selected methods can be instrumented by utilizing methods and systems, and more particularly transaction monitoring agents, provided by the invention, as discussed in more detail below.

In particular, a system of invention can include a bytecode instrumentation engine that can be utilized to modify the bytecode associated with a Java application at any time prior to, or during, the loading and initialization of the bytecode by a Java virtual machine (JVM). More specifically, the bytecode instrumentation engine can include a tool, herein referred to as Bytecode Instrumentation Program (BIP), and another tool, herein referred to as Bytecode Instrumentation Controller (BIC), that can modify methods of classes associated with a Java application prior to being loaded by a JVM or as they are loaded by a JVM.

The BIC tool can receive a byte array containing a Java class and can return a modified version of the byte array containing one or more methods in that class in which selected instrumentation code is inserted, as discussed below. The inserted code is herein referred to as an instrumentation hook and represents a bridge between an instrumented method and the instrumentation code.

Figure 2:
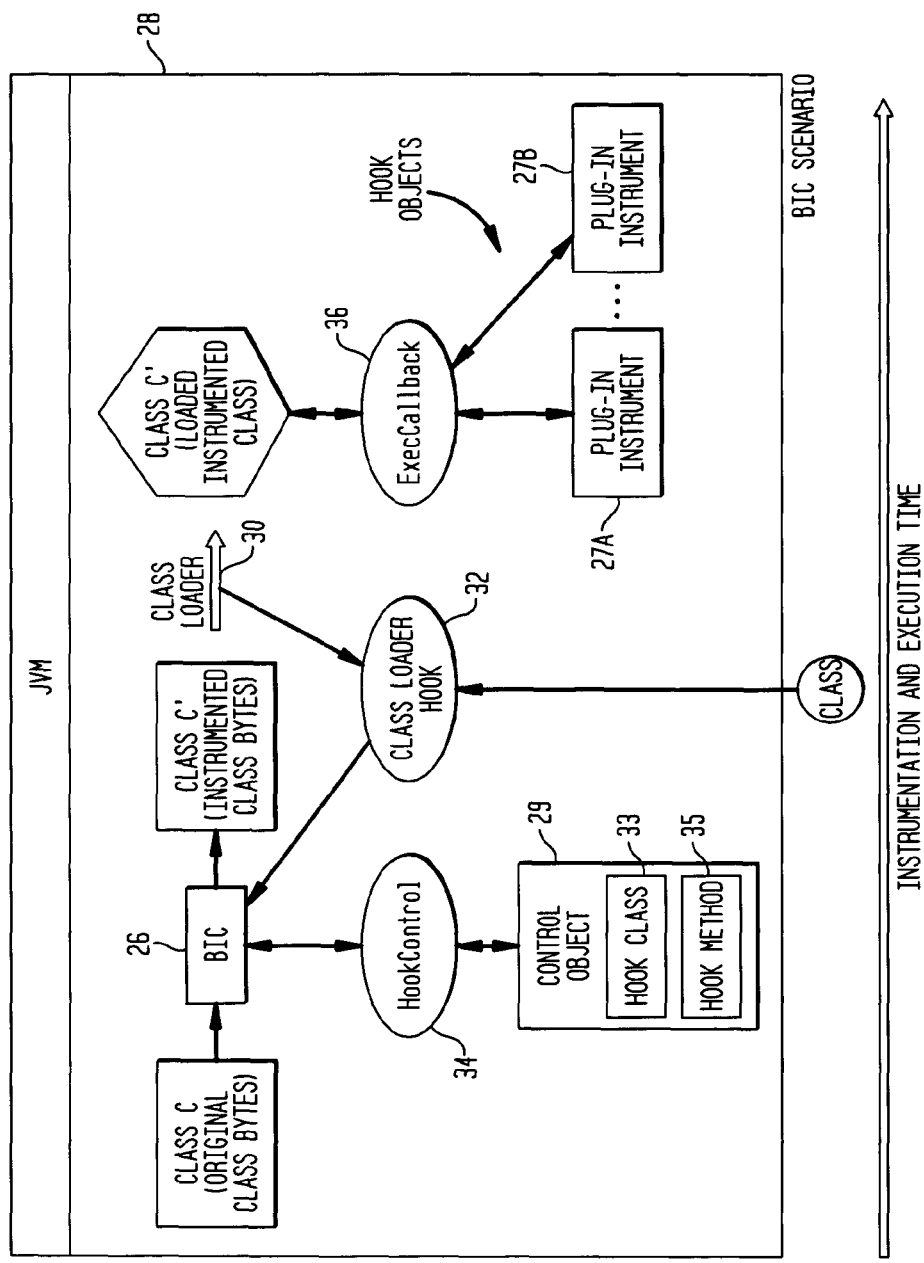
FIG. 2 schematically depicts the use of an instrumentation engine according to one embodiment of the invention for modifying bytecode representation of selected methods of a class.

By way of example, FIG. 2 schematically illustrates modification of an exemplary class C, and more specifically modification of one or more methods of class C, of a Java application by the BIC tool 26 of the invention as the class is being loaded by a JVM 28 running on an application server, e.g., a J2EE application server. The application server can employ a class loader 30 that provides a class loader hook interface 32. The class loader hook 32 invokes the BIC tool 26 to determine whether any methods of the exemplary class C need to be instrumented. The BIC tool in turn determines whether any method(s) of class C is slated for bytecode modification by communicating with an interface 34, herein referred to as HookControl interface, that directs the bytecode modification process. More particularly, the HookControl interface 34 allows a user to identify selected classes or interfaces, and selected methods associated with these classes, for instrumentation.

In some embodiments, the HookControl interface 34 can be implemented by utilizing XML or other notation to allow dynamically identifying classes, and method associated with these classes, for instrumentation.

The HookControl interface 34 can direct instrumentation of selected methods of software components, such as, servlets, JSP classes, EJB classes, and JDBC classes. For example, for JSP classes, the _jspService method can be identified for instrumentation. As another example, the service method or the doFilter, doGet, and doPost methods of servlet classes can be selected for instrumentation. For EJB classes, the HookControl interface 34 can direct, for example, instrumentation of the container-generated EJB object class, which wraps the user written EJB. Further, within an EJB wrapper class, selected methods, for example, all methods other than selected utility methods, can be instrumented. As another example, for JDBC classes, methods, such as GetConnection, ExecuteQuery, or selected methods in Java.sql or JavaX.sql package, can be instrunmented. The above recited methods are only exemplary, and those having ordinary skill in the art will appreciate that methods other than those recited above can also be instrumented in accordance with the teachings of the invention.

With continued reference to FIG. 2, if the BIC tool 26 identifies, upon communication with the HookControl interface 34, one or more methods of class C for instrumentation, the BIC tool 26 operates on the bytecode representations of these methods, in a manner described below, to insert instrumentation code therein. In other words, for each method that is slated for instrumentation, the BIC tool 26 generates a wrapper method that contains instrumentation code for determining the response time of that method. A class containing wrapper methods corresponding to selected methods of class C is herein designated as class C'.

A second interface, herein referred to as ExecCallback interface 36, controls processing of the instrumentation code in the wrapper methods during their execution. More particularly, the ExecCallback interface defines a callback object that receives calls from the instrumentation code at selected points. e.g., the instrumentation points, during the execution of a wrapper method.

Hence, the BIC tool 26 generates wrapper methods "on-the-fly", that is, as the bytecode representations of these methods are about to be loaded onto a JVM. In other words, the BIC tool instruments selected methods of Java classes without modifying their respective source codes and while the classes are being loaded for execution.

Figure 3:
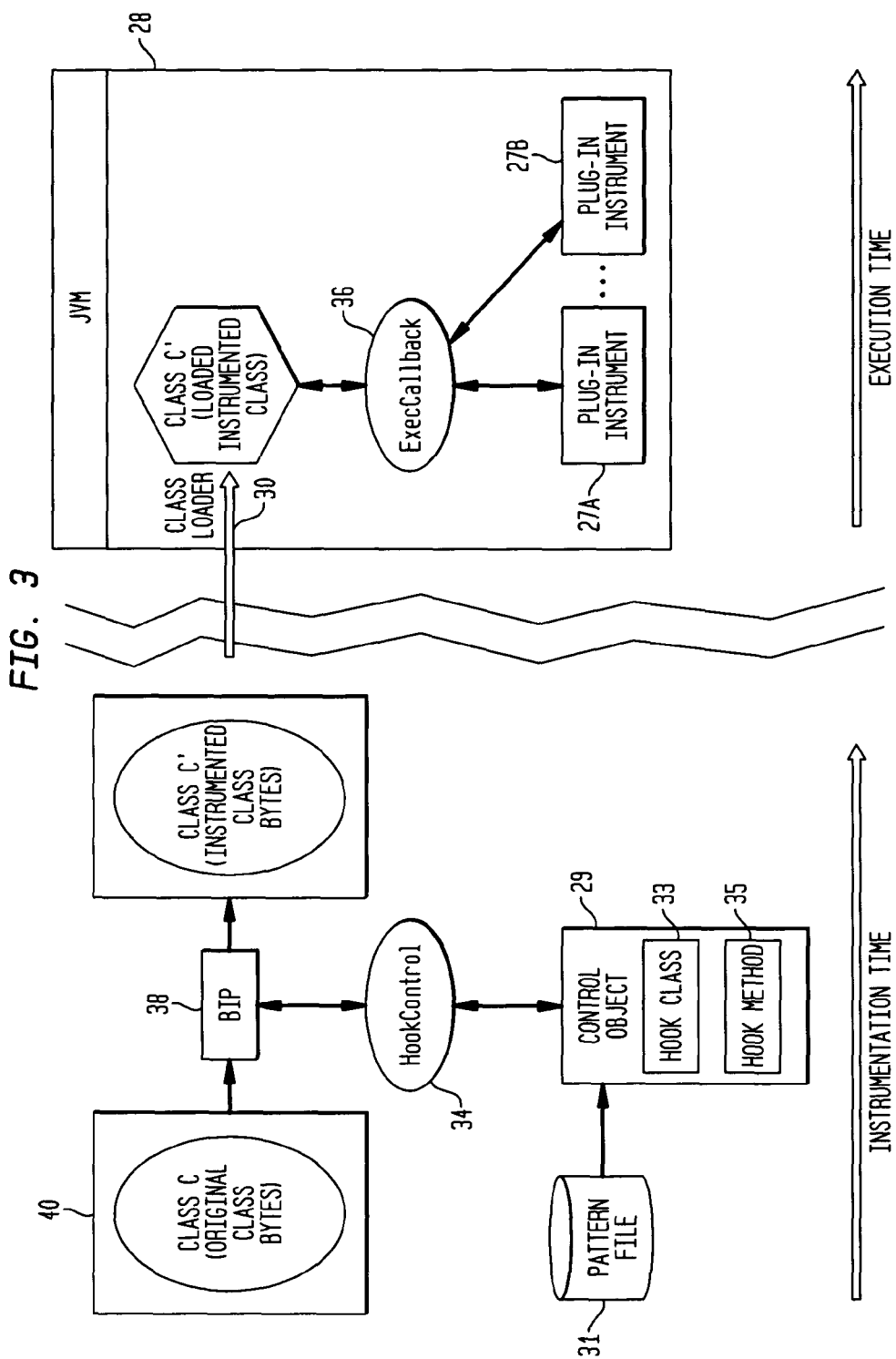
FIG. 3 schematically depicts the use of another instrumentation engine according to another embodiment of the invention for modifying bytecode representation of selected methods of a class.

With reference to FIG. 3, a BIP tool 38 in an instrumentation engine of the invention that generates modified class files before execution. For example, the BIP tool 38 can operate on a class file 40 corresponding to class C to insert instrumentation code in selected methods of class C in order to generate an wrapper class C'. The inserted instrumentation code associated with one or methods of the wrapper class C' can invoke the ExecCallback interface 36 in a manner similar to that described above in connection with the BIC tool 26. Similar to the BIC tool 26, the BIP tool 38 also communicates with the HookControl interface 34 to identify classes, and selected methods within those classes, for instrumentation. During execution, the JVM simply loads the modified classes. If a class loader hook is available, it may be more advantageous to utilize the BIC tool rather than the BIP tool.

Instrumentation Engine (Bytecode Instrumentation)

The BIC 26 and BIP 38 instrumentation tools are described herein with reference to Java programs, but these tools are also useful with any language whose compiler produces bytecodes. As previously mentioned, these tools read, modify and write modified classes for the purpose of installing hooks in selected methods. The BIP tool 38 writes the modified classes to a new class file or class archive (collectively hereinafter referred to as a class file), whereas the BIP tool 26 writes the new class file to memory. These hooks enable additional behaviors to be included when the classes are executed, without modifying source code of the classes. The execCallback interface 36 enables various types of monitoring tools (hereinafter "plug-in instruments") to be plugged into the interface and receive information when the classes are executed. FIG. 3 shows two exemplary plug-in instruments 27A and 27B, although more or fewer instruments can be used. For simplicity, most examples will be explained with reference to exemplary plug-in instrument 27A. Also for simplicity, most examples will be explained with reference to the BIP instrumentation tool 38, although most of these explanations also apply to the BIC instrumentation tool 26.

The HookControl interface 34 enables the BIP instrumentation tool 38 to send information about the classes and their methods to a control object 29 (sometimes also referred to as a "HookControl object"). The control object 29 can select which classes and methods are to be instrumented and what kinds of information is to be passed to the plug-in instrument 27A when the instrumented methods are called. The control object 29 can identify the selected methods and kinds of information to the BIP instrumentation tool 38 via the HookControl interface 34. Alternatively, a pattern file 31 can be used to create the control object 29 that can select which methods are to be instrumented and kinds of information that is to be passed to the plug-in instrument 27A. The pattern file 31 can contain descriptors of classes and/or method that are to be included and/or excluded from instrumentation. The syntax of the pattern file can include, for example, regular expressions, wildcard characters or any other syntax that can be used to identify individual classes or methods or groups thereof, as is well known in the art.

Two kinds of execution-time events can be monitored. The first kind is referred to as "class load" events. After a class is loaded, but before execution begins, the plug-in instrument 27A can be made aware of methods that are defined by the classes. The second kind of execution-time event is referred to as "method call" events. During execution of a class, the plug-in instrument 27A can be notified of calls to the methods. In particular, the instrument 27A can be notified of each instrumented method's entry, exit and exceptions that occurred during execution of the method, as well as (optionally) arguments passed to the method. The instrument 27A can control whether it will be notified of arguments passed to the method or the method's exit. The plug-in instrument 27A implements the execCallback interface 36 to receive this information and exercise this control.

Advantageously, different plug-in instruments can be used at different times without re-instrumenting the classes. In other words, during subsequent executions of the class, a different set of instruments 27A-B can be used. Class/method instrumentation (i.e. inserting hooks) is, therefore, decoupled from the behavior of the plugged-in instruments (i.e. execution-time behaviors). The instruments 27A-B can perform various functions or exhibit various behaviors, such as collecting data and monitoring performance of the instrumented methods and classes, debugging code, providing security or anything that requires information about method calls in the instrumented classes. In addition, the classes can be executed with a "null instrument", which simply returns. In addition, each instrumented class can be bound to a different implementation of the execCaliback interface 36, i.e. to a different plug-in instrument 27A-B.

An instrumented class notifies an object, such as the plug-in instrument 27A, of events occurring in the instrumented class by calling methods in the plug-in instrument. These events can include class loads, method definitions, method calls, method exits, exceptions and argument passing. These called methods can include classLoadStart, defMethod, methodEntry, methodExit, methodException and reportArg. These methods are defined by the execCallback interface 36, and the plug-in instrument 27A implements this interface. The instrumentation tool 38 inserts instrumentation code into the instrumented class to call these methods, but before these methods can be called, an appropriate plug-in instrument object must exist.

The instrumentation tool 38 inserts instrumentation code into the instrumented class to load an appropriate plug-in instrument object when the instrumented class is initialized. To ensure an instrument object that implements the execCallback interface 36 is loaded before any methods in the instrumented class are called, the instrumentation tool 38 modifies the class initialization method <clinit> of the instrumented class to load the instrumentation object at class initialization time. If the instrumented class does not include a <clinit> method, instrumentation tool 38 inserts one that includes a return. The <clinit> method calls a static method "getHook" (or a method that calls getHook), which either creates the plug-in instrument object or uses a factory object to create the plug-in instrument object. [What is the difference between the getHook method and the $BIP$installHook method???] If the instrumented class does not include a <clinit> method, and the instrumented class implements the Serializable interface, another mechanism is used to load the plug-in instrument object, as described below.

In addition to method calls, the instrumentation tool 38 also stores constants, such as literal strings, in the instrumented class. For example, these constants can be stored in the constants pool of the instrumented class. These literal strings can be passed as parameters to the methods that create the plug-in instrument objects and the methods, such as methodEntry, defined by the instruments. For example, getHook can use one of these literal strings as a name of a class to load in order to create or locate an appropriate plug-in instrument object. If the getHook method cannot locate the named class, it can create a "null" plug-in instrument object, in which all the methods consist of returns.

The following six sections describe: (1) selecting classes and methods to instrument, (2) hook insertion, (3) the execCallback interface to instruments, (4) events occurring at class-load time, (5) events occurring at method call time and (6) alternative and optional embodiments.

Selecting Classes and Methods for Instrumentation

The HookControl interface 34 between the BIP instrumentation tool 38 and the control object 29 enables the control object to control which classes and methods are instrumented. During execution of the BIP instrumentation tool 38, the tool loads an external control class and instantiates a control object 29 from this class. The external control class can be specified, for example, with a command line parameter to the instrumentation tool 38. If no external control class is specified, a default control class, which instruments all static and instance methods, is preferably used. The HookControl interface 34 defines several methods, including hookClass and hookMethod, by which the instrumentation tool 38 communicates with the control object 29. The control object 29 implements the hookClass 33 and hookMethod 35 methods, as well as other methods described below. During some interactions, the hookClass 33 and hookMethod 35 methods and the instrumentation tool 38 pass a hookClass object 37 between them.

For each class the instrumentation tool 38 finds in the class file 40, the instrumentation tool collects context information, such as information about all superclasses and superinterfaces of the found class. This may require reading additional class files. The instrumentation tool 38 sends this class context information to the hookClass method 33, which returns an indication of whether the class is to be instrumented.

FIG. 4 illustrates a prototype 400 of the hookClass method 33. The "classname" parameter 402 of the hookClass method 33 contains the name of the found class. The "methods" parameter 404 is an array of names of methods found in the class. Preferably, the instrumentation tool 38 identifies static and instance methods in the "methods" parameter 404. The instrumentation tool 38 could be easily modified to also identify other methods, such as constructors, for instrumentation, if desired.

The "superclasses" parameter 406 is an array of names of classes that are superclasses of the found class. The "superinterfaces" parameter 408 is an array of names of interfaces that are superinterfaces of the found class. If the instrumentation tool 38 succeeds in collecting context information about all the superclasses and superinterfaces of the found class, superclasses[0] contains the name of the immediate superclass and superclasses[last] contains "java.lang.Object". On the other hand, if the instrumentation tool 38 cannot ascertain all the superclass and superinterface information, the "superclasses" array contains one element, i.e. the immediate super class, and the "superinterfaces" array contains only direct interfaces.

The "getHookArg" parameter 410 is passed as an empty StringBuffer to the hookClass method 33. The hookClass method 33 can return a value in the "getHookArg" parameter 410. For example, the hookClass method 33 can use an "append" method to modify this StringBuffer. If the hookClass method 33 returns a non-null value in "getHookArg", this value will be stored in the constants pool of the instrumented class. In addition, bytecodes will be inserted in the instrumented class to cause the instrumented class to pass this value as a string literal argument to a getHook method (described below) during class initialization. In particular, this value will be bound to a "classKind" parameter of the getHook method. This value could, for example, be used to identify the particular control object 29 that made the class/method instrumentation decisions. This value can also be made available to the plug-in instrument 27A via the execCallback interface 36, as described in more detail below.

If the found class is not to be instrumented, the hookClass method 33 returns null, and the instrumentation tool 38 ignores the methods of the found class and proceeds to the next found class. On the other hand, if the found class is to be instrumented, the hookClass method 33 instantiates a non-null hookClass object 37 and returns this object to the instrumentation tool 38. The design of this object is left to the designer of the control object 29. This object is passed to the hookMethod method 35, so it can be used to communicate information from the hookClass method 33 to the hookMethod method 35.

For each method the instrumentation tool 38 finds in a class that is to be instrumented, the instrumentation tool collects context information, such as the name of the class, the name of the method and the superinterfaces. The instrumentation tool 38 sends this context information to the hookMethod method 35, which returns an indication of whether the method is to be instrumented and, if so, whether argument reporting is to be performed.

FIG. 5 illustrates a prototype 500 of the hookMethod method 35. The "classcontext" parameter 502 of the hookMethod method 35 contains a reference to the hookClass object 37 returned by the hookClass method 33. The control object 29 can use the hookClass object in any way that is useful. The "classname" parameter 504 contains the name of the found class. The "methodname" parameter 506 contains the name of the found method. The "superinterfaces" 508 parameter is an array of names of interfaces. The set of interfaces represented by this parameter is a subset of the interfaces represented by the "superinterfaces" parameter 458 to the hookClass method 33. In particular, the "superinterfaces" parameter 508 represents the interfaces that are implemented by the method.

The "defMethodArg" parameter 510 is passed as an empty object to the hookMethod method 35. The hookMethod method 35 can create a string value and return it via the "defMethodArg" parameter 410. In addition, bytecodes will be inserted in the instrumented class to cause the instrumented class to pass this value as a string literal argument to a defMethod method (described below) during class initialization. In particular, this value will be bound to a "methodKind" parameter of the defMethod method. During class initialization, the defMethod method will be called once for each instrumented method in the class.

The hookMethod method 35 can return one of several values 520 to indicate whether the found method is to be instrumented or not and, if it is to be instrumented, whether argument reporting is to be performed. If the method is not to be instrumented, the hookMethod method 35 returns "DO_NOT_HOOK" 522. If the method is to be instrumented, but without argument reporting, the hookMethod method 35 returns "HOOK_NO_ARGS" 524. If the method is to be instrumented, and all arguments are to be reported, the hookMethod method 35 returns "HOOK_WITH_ARGS" 526.

Optionally, the hookMethod method 35 can return other values. For example, if the method is to be instrumented, and only the first argument is to be reported, the hookMethod method 35 can return "HOOK_WITH_ARG1" 528. If the method is to be instrumented, and only the first and second arguments are to be reported, the hookMethod method 35 can return "HOOK_WITH_ARG1_2" 530. If the method is to be instrumented, and only the second argument is to be reported, the hookMethod method 35 can return "HOOK_WITH_ARG2" 532. In other embodiments, other return values can be used to represent other combinations of arguments, depending on the flexibility and scope of argument reporting required. If the found method is to be instrumented, the value returned by the hookMethod method 35 is referred to as a "how" value, and a hook is inserted in the method, as described below.

Other methods of the HookControl interface 34 include getClientName, getClientVersion, passClassObject and setParams. For each class that was selected for instrumentation by the hookClass method, the instrumentation tool 38 calls the getClientName method. No parameters are passed to this method. The getClientName method can return a string that will be passed to the getHook method when the instrumented class is loaded. This string will be passed in a parameter named "clientName". Similarly, the getClientVersion method is called by the instrumentation tool 38 for each class that was selected for instrumentation by the hookClass method. No parameters are passed to the getClientVersion method. The getClientVersion method can return a string that will be passed to the getHook method when the instrumented class is loaded. This string will be passed in a parameter named "clientVersion". These values refer to a name and version number of a plug-in instrument that is to be used with this class. The getHook method will use these values, or a system property, to find or create an appropriate plug-in instrument, such as plug-in instrument 27A. In particular, clientName is used here as a property key whose value should be the name of a class that will be loaded and will implement the ExecCallback interface 36. If the getHook method cannot find or create an appropriate plug-in instrument, it will use a dummy, i.e. null, plug-in instrument that simply returns.

For each class that was selected for instrumentation by the hookClass method, the instrumentation tool 38 calls the passClassObject method. No parameters are passed to this method. The passClassObject method returns a boolean value. If this value is true, at class load time the classLoadStart method will be passed a Class object as the classObj parameter, otherwise it will be passed null. The Class object is a run-time type representation of the class created by the JVM.

The instrumentation tool 38 calls the setParams method after the control object is created. The instrumentation tool 38 passes the value of System.getProperty ("bip.hookcontrol.params") to the setParams method in a string parameter named "params". The control object can use this value or ignore it. The setParams method is void, so it does not return any value.

Figure 6A:
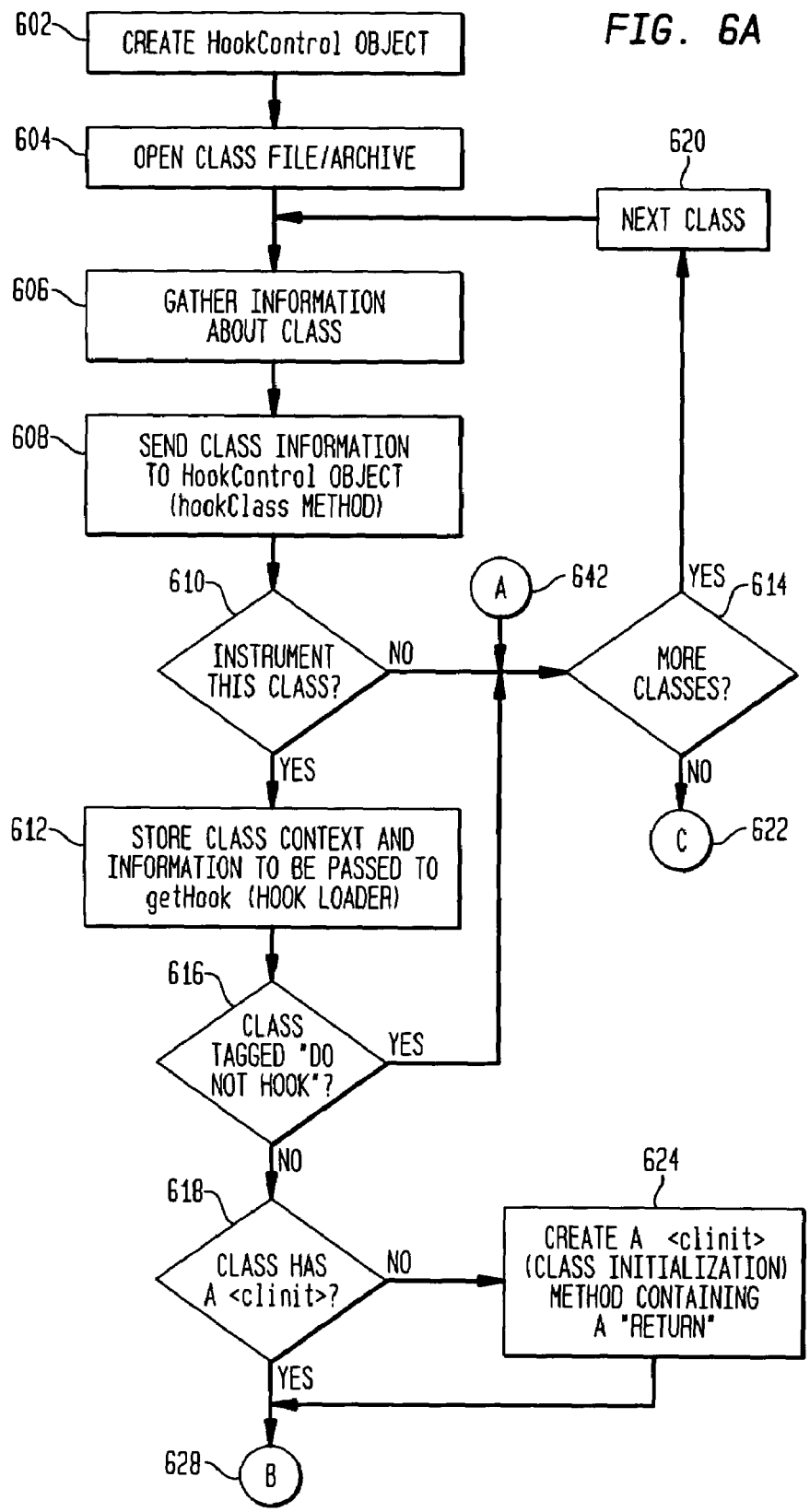
FIGS. 6A-C contain a flowchart illustrating how classes and methods can be selected for instrumentation by the control object of FIGS. 2 and 3, according to one embodiment of the present invention.
Figure 6B:
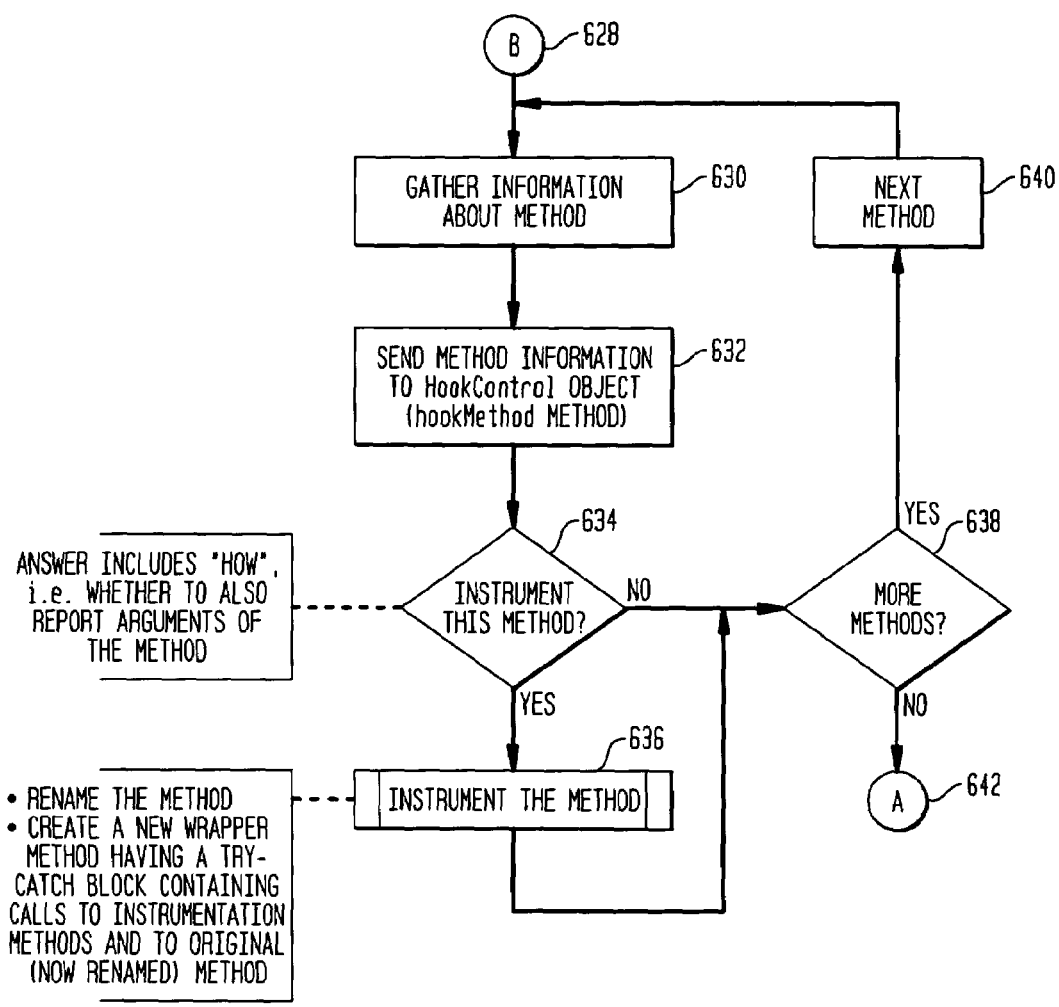
Figure 6C:
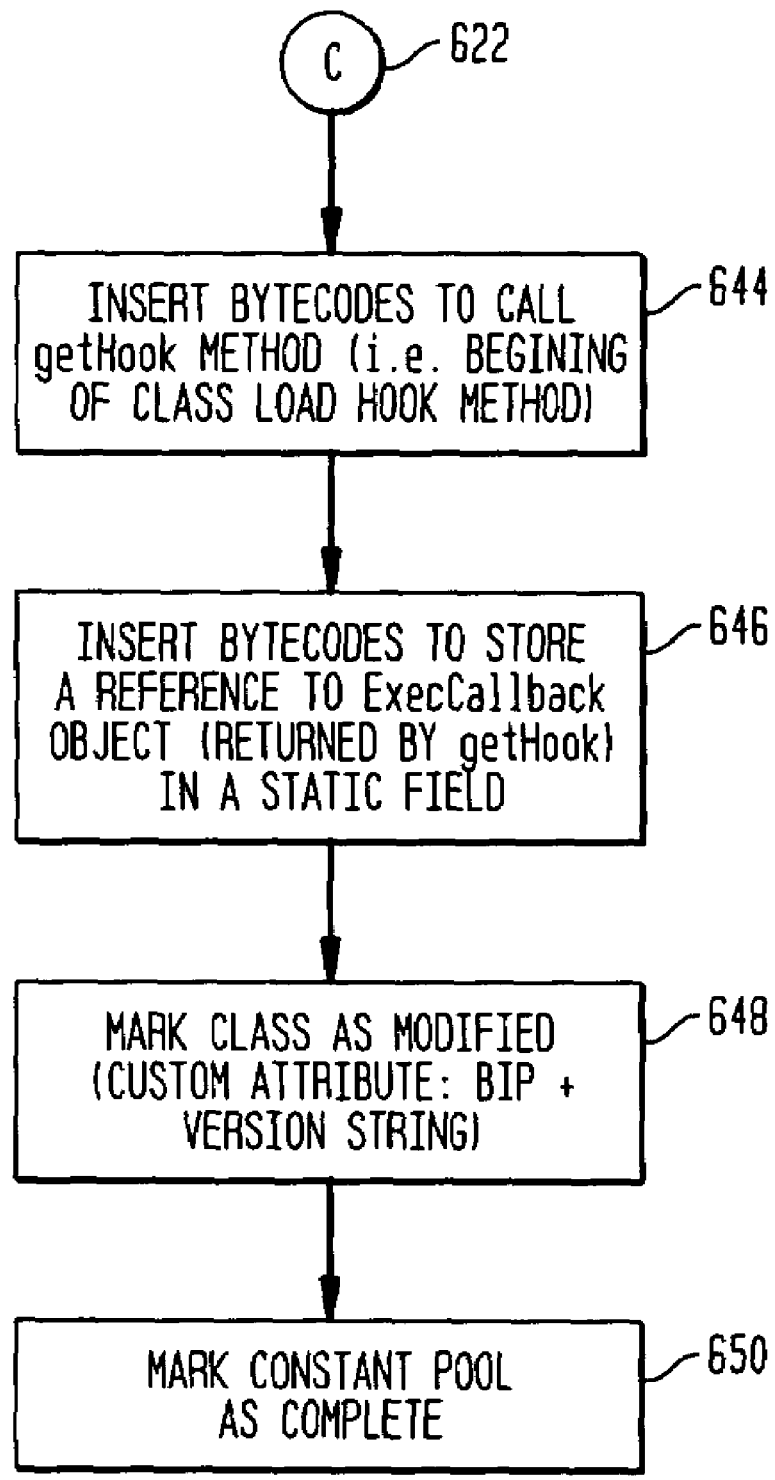

FIGS. 6A-C contains a flowchart 600 illustrating how classes and methods can be selected for instrumentation, according to a simplified embodiment of the invention. At 602, a HookControl object, such as control object 29 (FIG. 3), is created. At 604, a class file or archive is opened. At 606, information about the (first) class is gathered. As previously mentioned, this might include opening additional class files to gather information about superclasses and superinterfaces. At 608, this class information is sent to the HookControl object, such as by calling the hookClass method. At 610, if the HookControl object indicates that this class should be instrumented, control passes to 612. Otherwise, control passes to 614.

At 612, the class information and information to be passed to the getHook method are stored in a temporary location. At 616, if the class is marked "DoNotHook" by the interface, control passes to 614. Otherwise, control passes to 618. Hook and instrumentation classes should generally not be instrumented, to avoid recursion problems. These classes are, therefore, generally marked "DoNotHook".

At 614, if the class file/archive contains more classes, control passes to 620. Otherwise, control passes to offer-page connector "C" 622 in FIG. 6C. At 620, consideration is advanced to the next class, and control passes to 606.

At 618, if the class does not include a <clinit> method, control passes to 624, where bytecodes are inserted to create a <clinit> class initialization method containing a return. On the other hand, if the class already includes a <clinit> method, control passes to off-page reference "B" 628 and thence to 630 in FIG. 6B.

At 630, information about the (first) method is gathered. At 632, this information is sent to the HookControl object, such as by calling the hookMethod method. At 634, if the HookControl object indicates that this method should be instrumented, control passes to routine 636, which is described in more detail in FIGS. 8A-C. The routine 636 instruments the method. After the routine 636 completes, or if the decision at 634 is negative, control passes to 638. At 638, if there are more methods in this class, control passes to 640. At 640, consideration advances to the next method of the class, and control passes to 630. On the other hand, at 638, if there are no more methods in this class, control passes to off-page reference "A" 642, i.e. to decision 614 in FIG. 6A.

Referring now to FIG. 6C, at 644, bytecodes are inserted into the instrumented class to call the getHook method from the <clinit> method. At 646, bytecodes are inserted to store a reference to an "ExecCallback" object, such as a plug-in instrument object, returned by the getHook method. For example, this reference can be stored in a static field.

At 648, the modified class is marked as having been modified, such as by setting a custom attribute. This custom attribute can be, for example, a name-value pair, such as "BIP" plus a version number of the instrumentation tool 38. Marking the class as having been modified can prevent the instrumentation tool 38 from subsequently instrumenting this class again, for example if it is inadvertently subsequently processed by the instrumentation tool a second time. In addition, the instrumentation tool 38 or another tool can be used to ascertain if the class has been modified and, if so, which methods were instrumented. While modifying this class, the instrumentation tool 38 added constants to the constants pool. At 650, the constants pool of the class is marked as being complete with its new size.

Hook Insertion

The instrumentation tool 38 treats a class definition as an array of bytes that can be modified or extended. In general, the instrumentation tool 38 modifies a class by inserting constants into the class's constants pool, inserting bytecodes, inserting tables or other data structures and adding and modifying parameters, flags etc. in the class. In doing so, the instrumentation tool 38 operates somewhat like a code generator in a compiler. For example, when the instrumentation tool 38 inserts bytecodes to call a method, the instrumentation tool inserts appropriate bytecodes to load parameters, invoke the method, such as with an "invokeinterface" or "invokespecial" bytecode, and test or store the return value. In another example, the instrumentation tool 38 inserts a table, creates labels, calculates offsets and inserts bytecodes to trap exceptions and transfer control to an exception handler, as if a compiler were compiling a try-catch block.

Unlike a compiler, the instrumentation tool 38 does not generate bytecodes, etc. in response to reading source code. Instead, the instrumentation tool 38 inserts bytecodes in response to an analysis of an existing class. For simplicity, the following description does not list every bytecode inserted. Instead, the description explains the functions of the inserted bytecodes. Common code generation techniques, such as those used by a compiler, can be used to select appropriate bytecodes, constants or tables to insert, local storage to allocate, etc.

To insert a hook into a method, the instrumentation tool 38 renames the original method to $BIP$<originalName> and creates a new "wrapper" method having the original method's name and attributes. Thus, if a program attempts to call the original method, control instead passes to the wrapper method. FIG. 7 is a listing of an exemplary wrapper method

700. In the example of FIG. 7, the original method's name was "buy", and the renamed method "$BIP$buy" appears at 701.

As previously mentioned, the plug-in instrument 27A implements the execCallback interface 36 (FIG. 3). The exec-Callback interface 36 includes several methods, including methodEntry, methodExit, methodException and reportArg. As will be described in more detail below, the wrapper method 700 calls the methodEntry method at 702 before calling the renamed original method at 704, and it calls the methodExit method at 706 after control returns from the renamed original method. If argument reporting was selected, the wrapper method 700 also calls the reportArg method at 708 and 710 for some or all of the arguments 712 of the renamed original method.

The wrapper method 700 includes a try-catch block 714 around the call to the renamed original method at 704. If an exception occurs during execution of the renamed original method at 704, the wrapper method 700 calls the methodException method at 716. A local variable named "tradeResult" 718 is used to store a value returned by the renamed original method at 720. This local variable is used to provide a return value of the wrapper method 700 at 722. The original method's access flag is set to "private" 724 to prevent it from being called directly, except by the wrapper method 700.

To build the wrapper method 700, bytecodes are inserted to load arguments and call 702 the methodEntry method and to store 726 a reference to a value returned by the methodEntry method in local storage 728. This return value is a reference to a "methodEntry" object, which essentially represents the invocation of the instrumented method. The methodEntry object is used in making decisions at 730 and 732 regarding calls to reportArg and methodExit, as described in more detail below.

Figure 8A:
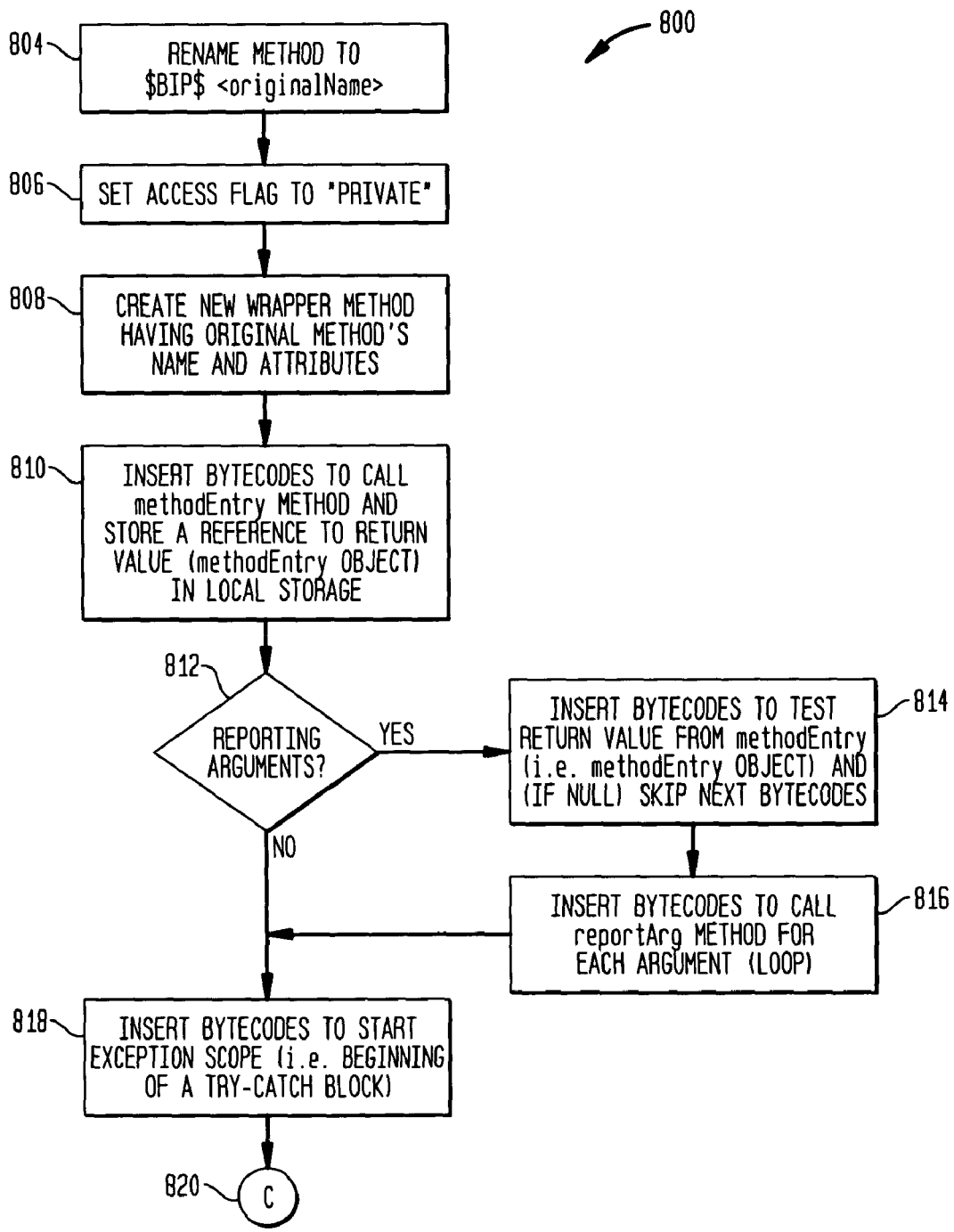
FIGS. 8A-C contains a flowchart illustrating how a method can be instrumented by the instrumentation tools of FIGS. 2 and 3, according to a simplified embodiment of the invention.
Figure 8B:
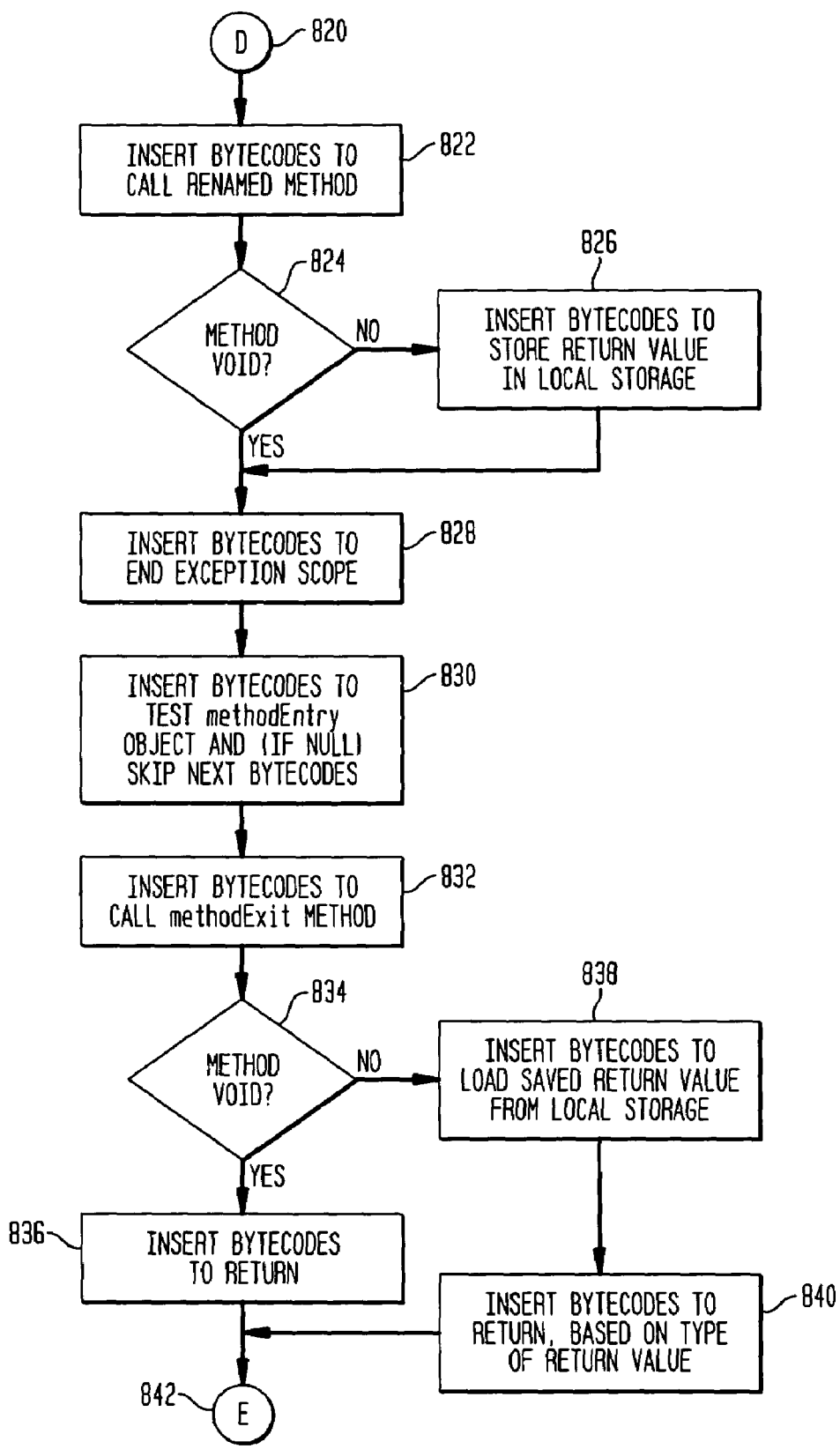
Figure 8C:
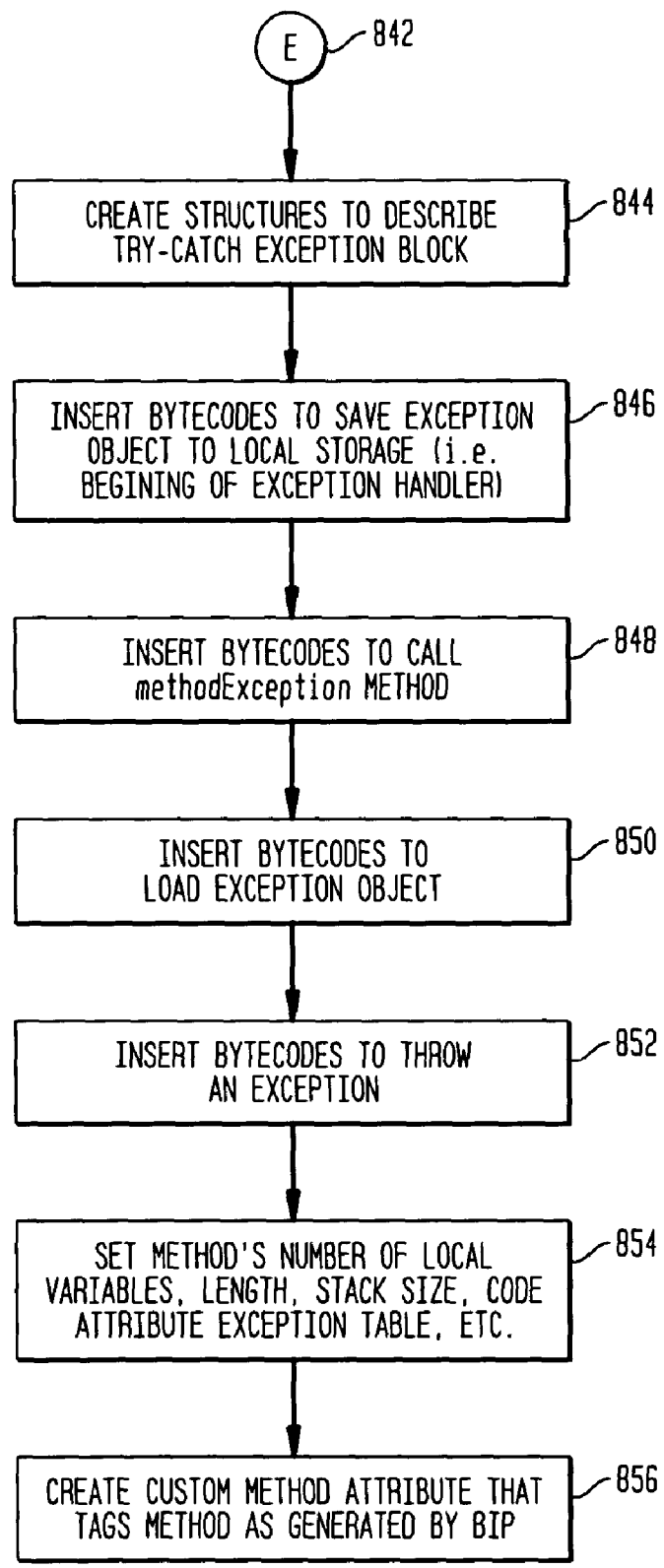

FIGS. 8A-C contains a flowchart 800 illustrating how a method can be instrumented, according to a simplified embodiment of the invention. As previously described, the value returned by the hookMethod method 35 (FIG. 3) is referred to as a "how" value that encodes whether argument reporting is to be performed for a method and, if so, which arguments are to be reported. At 804, the original method is renamed to $BIP$<originalName>. At 806, the original renamed method's access flag is set to "private". At 808, bytecodes are inserted to create a new wrapper method having the original method's name and attributes. At 810, bytecodes are inserted to call the methodEntry method and store a reference, in local storage, to a methodEntry object returned by the methodEntry method.

At 812, if arguments are to be reported, control passes to 814. Otherwise control passes to 818. At 814, bytecodes are inserted to test the return value from the methodEntry method. If the return value from the methodEntry method is null, the inserted bytecodes skip the next bytecodes. Thus, if the methodEntry method returns null, no arguments will be reported. At 816, a loop causes bytecodes to be inserted to call the reportArg method, i.e. the reportArg method will be called once for each argument that is to be reported.

At 818, the bytecode offset is recorded to start an exception scope, i.e. the beginning of the try-catch block. At off-page connector "D" 820, control passes to 822 on FIG. 8B. At 822, bytecodes are inserted to call the renamed original method. Of course, bytecodes are also inserted to pass the appropriate number of parameters, and of the appropriate types, to the renamed original method. At 824, if the original renamed method is void, i.e. no return value is expected, control passes to 828. Otherwise, at 826, bytecodes are inserted to store the return value from the original renamed method in local storage, and control passes to 828.

At 828, the bytecode offset is recorded to end the exception scope begun at 818. At 830, bytecodes are inserted to test the methodEntry object and, if it is null, to skip the next bytecodes. At 832, bytecodes are inserted to call the methodExit method. Note that if the methodEntry object is null, the methodExit method is not called.

At 834, if the original renamed method is void, at 836, bytecodes are inserted to return. On the other hand, if the original renamed method is not void, at 838 bytecodes are inserted to load the saved return value, i.e. the value saved by the bytecodes inserted at 826, from local storage. At 840, bytecodes are inserted to return, based on the type, i.e. int, float, etc., of the return value of the original renamed method. Off-page connector "E" 842 passes control to 844 FIG. 8C.

At 844, structures to describe the try-catch block are created. At 846, bytecodes are inserted to save an exception object in local storage, i.e. the beginning of an exception handler is inserted. At 848, bytecodes are inserted to call the methodException method. At 850, bytecodes are inserted to load the exception object. At 852, bytecodes are inserted to throw an exception. Thus, if an exception occurs while the original renamed method executes, the Java virtual machine (JVM) creates an exception object and calls the inserted exception handler. The inserted exception handler calls the methodException method, passing the exception object to the methodException method. When the methodException method returns, the inserted exception handler throws the exception.

At 854, the method's number of local variables, length, stack size, code attributes, exception table, etc. are set. At 856, a custom attribute is given to the wrapper method indicating that the method has been generated by BIP.

As described above, bytecode modification and insertion are well within the knowledge of an ordinary practitioner, and will not, therefore, be described in more detail. More information can be had by referring to: "Supporting the Integration and Evolution of Components Through Binary Component Adaptation", cs.ucsb.edu/labs/oocsb/papers/bca.html; "BIT: Bytecode Instrumenting Tool", cs.colorado.edu/.about.hanlee/BIT/; "Byte Code Engineering Library", bcel.sourceforge.net/; "CFParse", alphaworks.ibm.com/tech/cfparse; "Package gnu.bytecodesources.redhat.com/kawa/api/gnu/bytecode/package-summary.html; "Jikes Bytecode Toolkit", alphaworks.ibm.com/tech/jikesbt; or "The Java Object Instrumentation Environment", duke.edu/ari/joie/, all of which are hereby incorporated by reference.

The execCallback Interface to Instruments

Several methods of the execCallback interface 36 (FIG. 3) have been described above. These and additional methods of the execCallback interface 36 will now be described in detail. FIG. 9 illustrates a prototype 900 of the "classLoadStart" method. This method is called by an instrumented class, i.e. by bytecodes inserted in the class's <clinit> method or by methods called therefrom, at the beginning of class initialization. The "classname" parameter 902 is the name of the instrumented class. The "classObj" parameter 904 is either null or a "Class object", depending on whether the passClassObject method returned true or false when the class was instrumented. The "methods" parameter 906 is a count of the methods that will cause calls to the defMethod method (described below), i.e. the number of instrumented methods in the class. The classLoadStart method returns a class reference object, which will be passed to other methods, such as defMethod, classLoadEnd, methodEntry, reportArg, methodException and methodExit.

The classLoadStart method returns a reference to an object that represents the instrumented class. The design of this object is left to the designer of the plug-in instrument. This object will be passed to various methods, including defMethod, classLoadEnd, a methodEntry, reportArg, methodException and methodExit. This object can be used to store context information between calls to these methods or to instruct these methods. For example, this object can indicate to these methods what data should be collected concerning execution of the instrumented method, how this data should be processed or used, where the data should be sent or stored, etc. The classLoadStart method marks the beginning of the class load events mentioned above. By this mechanism, after a class is loaded, but before execution begins, the plug-in instrument 27A can be made aware of classes that are defined, and the plug-in instrument can be made to act differently for different classes.

FIG. 9 illustrates a prototype 920 of the "defMethod" method. This method is called by an instrumented class at the beginning of class initialization, once for each instrumented method in the class. The "classref" parameter 922 is a reference to the class reference object returned by the classLoadStart method, as described above. The instrument can use this to associate the instrumented method with the instrumented class that contains it. The "methodname" parameter 924 is the name of the method, on whose behalf the defMethod method is being called. The "methodkind" parameter 926 is the value of the defMethodArg parameter returned by the hoodMethod method, as described above.

The defMethod method returns a reference to an object that represents the instrumented method. The design of this object is left to the designer of the plug-in instrument. This object will be passed to various methods, including methodEntry, reportArg, methodException and methodExit. This object can be used to store context information between calls to these methods or to instruct these methods. For example, this object can indicate to these methods what data should be collected concerning execution of the instrumented method, how this data should be processed or used, where the data should be sent or stored, etc. By this mechanism, after a class is loaded, but before execution begins, the plug-in instrument 27A can be made aware of methods that are defined by the class, and the plug-in instrument can be made to act differently for different methods.

FIG. 9 illustrates a prototype 940 of the "classLoadEnd" method. This method is called by an instrumented class at the end of class initialization. The "classref" parameter 942 is a reference to the class reference object returned by the classLoadStart method, as described above. The call to classLoadEnd marks the end of the class load events. Further calls to the instrument object will be only method call events.

FIG. 10 illustrates a prototype 1000 of the "methodEntry" method. This method is called by a modified class at the start of each instrumented method. The "classref" parameter 1002 is a reference to the class reference object returned by the classLoadStart method. The "methodref" parameter 1004 is a reference to the object returned by the defMethod method. If the instrumented method is an instance method, the "instance" parameter 1006 is a reference to "this". Otherwise, the "instance" parameter 1006 is null. The "args" parameter 1008 contains a number of arguments passed to the wrapper method.

The methodEntry method can return a methodEntry object. If the methodEntry method returns a null value, the reportArg and methodExit methods will not be called. Thus, the methodEntry method can choose to forgo having the reportArg and methodExit methods called. The design of this object is left to the designer of the plug-in instrument. A reference to this object will be passed to the reportArg, methodException and methodExit methods.

FIG. 10 illustrates a prototype 1020 of the "reportArg" method. If argument reporting is selected and the methodEntry method does not return null, the reportArg method is called by a modified class once per argument. The reportArg method is called after the methodEntry method returns. The "context" parameter 1022 is a reference to the methodEntry object returned by the methodEntry method. The "classref" parameter 1024 is a reference to the class reference object returned by the classLoadStart method. The "methodref" parameter 1026 is a reference to the object returned by the defMethod method. The "argNumber" parameter 1028 contains 1 for the first argument, 2 for the second argument, etc.

The "methodArg" parameter 1030 contains the argument being passed to the instrumented method. The reportArg method is overloaded for the "methodArg" parameter. In other words, the reportArg method has five definitions. In one definition, the "methodArg" parameter is typed as int; in another definition, the "methodArg" parameter is typed as boolean; and in other definitions, the "methodArg" parameter is typed as byte, char and short, respectively.

FIG. 10 illustrates a prototype 1040 of the "methodExit" method. If the methodEntry method does not return null, the methodExit method is called by a modified class at the end of each instrumented method. The "context" parameter 1042, "classref" parameter 1044 and "methodref" parameter 1046 are the same as described with reference to the reportArg method, above. The "result" parameter 1048 contains the return value of the renamed original method. As with the reportArg method, the methodExit method is overloaded for the "result" parameter.

Variations on the methodEntry method are possible. For example, FIG. 11 illustrates a prototype 1100 of an optional "methodEntryOneArg" method. If the hookMethod method returned "HOOK_WITH_ARG1", indicating that the method was to be instrumented and only the first argument was to be reported, instead of calling the methodEntry and reportArg methods, the instrumented class would call the methodEntryOneArg method. The first three parameters of this method are the same as for the methodEntry method, described above. The "selectedArg" parameter 1102 contains the selected argument. If more than one argument is to be reported, variations on the methodEntryOneArg method can be defined. For example, a "methodEntryTwoArg" method could be defined with "selectedArg1" and "selectedArg2" parameters, by which the selected parameters could be passed.

FIG. 11 illustrates a prototype 1120 of the "methodException" method. This method is called by a modified class if an exception is thrown by the renamed original method. The first three parameters of this method are the same as for the reportArg method, described above. The "e" parameter 1122 represents the exception thrown by the original renamed method.

Events Occurring at Class-Load Time

A Java virtual machine (JVM) includes a class loader, and an application server invokes this class loader to load one or more classes. Most application servers, such as the WebLogic Platform from BEA Systems, Inc. San Jose, Calif., include a class load hook, which can be used to execute a user-specified class before the JVM class loader loads a normal class. Depending on the application server, one might have to specify a name of the user-specified class and/or set a property when starting the application server to notify the application server to execute a user-specified class when loading normal classes. The application server might define an interface, and the user-specified class might implement this interface to communicate with the application server. Thus, the user-specified class can be provided with an opportunity to read and modify a class file as it is being given to the class loader. By this mechanism, the BIC instrumentation tool 26 can modify classes as they are being loaded.

As previously mentioned, the <clinit> method calls the getHook method when an instrumented class is loaded. FIG. 12 illustrates a prototype 1200 of the "getHook" method. The <clinit> method obtains literal strings from the class's constants pool to pass as parameters to the getHook method. These literal strings were stored in the constants pool by the instrumentation tool 38 from values returned by hookClass, as described above. The "className" parameter 1202 contains the name of the instrumented class. The "classKind" parameter 1204 contains the classKind parameter passed back to the instrumentation tool 38 by the hookClass method 33 via the getHookArg parameter. The "clientName" parameter 1206 is a property key whose value should be the name of a class that is to be loaded and is to implement the ExecCallback interface 36. The "clientVersion" parameter 1208 is another string supplied by the hookClass method. The "interfaceVersion" parameter 1210 is used to detect incompatible versions of the instrumentation tool 38 and the class that defines the getHook method.

The getHook method returns an ExecCallback object, which implements the ExecCallback interface, i.e. the getHook method returns a plug-in instrument. As previously mentioned, this object can be created by the getHook method, or the getHook method can use a factory object to create the ExecCallback object.

The <clinit> method calls several methods, including classLoadStart, defMethod and classLoadEnd, as previously described. For completeness, FIGS. 13A-D contain a listing of an exemplary null plug-in instrument class 1300. This listing can be used as a template for writing useful plug-in instrumentation classes.

Events Occurring at Method Call Time

As previously described with reference to FIG. 7, when an instrumented method is called, control passes to the corresponding wrapper method. The wrapper method calls the methodEntry method and optionally the reportArg method for each argument. Alternatively, the wrapper method calls one of the variations on the methodEntry method, such as methodEntryOneArg. Within a try-catch block, the wrapper method calls the renamed original method. If the renamed original method throws an exception, the wrapper method catches it and calls the methodException method. After the methodException method returns, the wrapper method throws the exception. If the renamed original method returns, the wrapper method saves the value returned by the renamed original method in a local variable. If the methodEntry method returned a non-null object, the wrapper method calls the methodExit method, passing the value returned by the renamed original method. Upon return from the methodExit method, the wrapper method returns the value returned by the renamed original method.

Alternative and Optional Embodiments

If the instrumented class does not include a <clinit> method, and the instrumented class implements the Serializable interface, a different mechanism is used to load the plug-in instrument object. Each class has a serialVersionUID, which is calculated from various aspects of the class, including the presence of a <clinit> method. So, adding a <clinit> method to a class modifies the class's serialVersionUID. The serialVersionUID is, however, used to identify a class when it requests a remote method invocation (RMI). So, instrumenting a class that requests an RMI can lead to a mismatch between an instrumented class's serialVersionUID and the serialVersionUID expected by the remote method. For classes that do not include a <clinit> method, but that implement the Serializable interface, the instrumentation tool 38 does not add <clinit> methods. Instead, a conditional call to$BIP$installHook is made at the entry of each modified method, as shown at 734 (FIG. 7). However, for instrumented classes that include a <clinit> method or that do not implement the Serializable interface, this conditional call is preferably omitted, and the wrapper method assumes that a suitable plug-in instrument was created during class initialization.

Instead of wrapping instrumented methods, classes can be modified by inserting bytecodes, constants, labels, etc. into the instrumented classes methods directly, so methodEntry, reportArg, methodException and methodExit are called from within the instrumented methods. Of course, offsets would have to be corrected to account for the inserted code, etc. This can be done using well-known techniques. Some existing bytecodes, such as jumps, might have to be changed as a result of the inserted bytecodes. The instrumented code should be enclosed within a try-catch block. Some of the bytecodes in the original method might have to be changed as a result of their now being within the try-catch block. These bytecodes could be changed to be ones that a compiler would have produced, if the oringinal source code had included an encompassing try-catch block. Since methods can have more than one exit location, calls to methodExit could be inserted at these locations, so the methodExit method would be called no matter how the method exits.

Instead of using interfaces (HookControl and ExecCallback), abstract classes could be used, as is well-known in the art.

ARM Synthesis

As discussed above, transaction monitoring agents according to the teachings of the invention allow instrumentation of selected methods of software components without modifying their associated source codes. The instrumentation can be implemented to generate selected metrics regarding the performance of the instrumented methods. One such metric relates to the response time associated with execution of a method of a software component. In some embodiments of the invention, the instrumentation code generates data regarding the response time of an instrumented method by invoking an Application Response Measurement (ARM) protocol that was first developed as ARM 1.0 version by Hewlett-Packard Company and Tivoli in 1996. Subsequently, ARM 2 and ARM 3.0 and ARM 4.0 versions were developed by a consortium of vendors and end-users.

The ARM protocol allows measuring a unit of work, which can be any sensitive transaction or a component of a sensitive transaction. More particularly, the ARM protocol provides an interface through which business applications and management applications can cooperatively measure the response time and status of transactions executed by these applications. For example, with reference to FIG. 14, an exemplary application 42, which can be, for example, a client or a server application, can call an ARM interface 44 when a selected transaction, for example, a method within the application, starts and when that transaction stops. The ARM interface 44 keeps track of the time elapsed between the start and the end of the transaction. The ARM interface can further transmit this timing data to a management agent 46 for analysis and reporting.

Traditionally, the use of ARM API calls within applications has required modification of the application's source code, which can be time-consuming and cumbersome and in some cases impossible. As discussed below, the present invention provides methods and systems that allow synthesizing ARM calls within selected methods of software components of interest without modifying the source codes associated with these methods.

The ARM 3.0 API protocol employs a method, referred to as newARMTranDefinition in the interface ArmDefinitionFactory, that provides three parameters, namely, a transaction type identifier, an application name, and a transaction name, for identifying a transaction for which ARM calls are issued.

The present invention provides additional transaction definitions, some of which are incorporated in ARM 4.0 protocol, by defining "attributes," also herein referred to as "properties," as key-value pairs. Both the key and the value can be arbitrary strings to accommodate a full description of various entities. For example, one preferred embodiment of the invention defines the following transaction definition interface, herein referred to as ExtendedTranDefinition, that extends the standard ArmTranDefinition interface:

```
public interface ExtendedTranDefinition
    extends ArmTranDefinition {
    public void setAttribute ( String key, String value);
    public String getAttribute (String key);
    ...
}
```

The attributes can generally be divided into component-level and method-level attributes. All transaction types arising from a given software component can have the same component-level attributes but different method-level attributes.

One attribute provided by an ARM protocol according to the invention allows distinguishing a "client-side" transaction from a "server-side" transaction. This attribute is referred to as the "Role" attribute that defines a "client-side" transaction as having a "requester" role in the software component interaction, and a "server-side" transaction as having a "responder" role.

Another attribute, herein referred to as componentKind, provides information regarding the type of software component from which ARM API calls are issued. More specifically, the componentKind attribute can identify the technology within which the respective component is implemented, and can further identify the classification of that component within that technology. In general, components of the same kind can be expected to have some common implementation, instrumentation, and methods. For example, in J2EE application servers, the componentKind attribute can identify the software component as a servlet, a JSP, a stateless session EJB, a stateful session EJB, a container-managed entity EJB, a bean-managed entity EJB, or a JDBC or other software component of interest.

Other defined attributes include a componentName that provides a reference name for a software component of interest, and a methodName attribute that provides a reference name for a method or a function associated with the software component. Further, a methodSignature attribute can be defined to distinguish Java methods having identical names.

For J2EE software components, the componentName attribute can be a fully qualified class name, that is, including the package name. For EJBs, this class name can be that of the remote interface, and for servlets and JSPs, it can be the implementation class or a canonical transformation of the implementation class name, e.g., name mangling. For JDBC, the componentName can be the JDBC interface, and possibly the driver's name.

Those having ordinary skill in the art will appreciate that attributes other than those recited above can also be defined. For example, a deploymentName attribute can be optionally defined to provide a user-defined name associated with a software component, or an applicationName can be defined to provide a reference name for the application that contains a software component of interest.

The incorporation of ARM API calls into selected methods of software components of interest can be accomplished by a transaction monitoring agent of the invention by employing the BIC tool 26 or the BIP tool 38 described above (See FIGS. 2 and 3). More specifically, the BIC tool or the BIP tool can be utilized to insert instrumentation code or hooks into selected methods of the software components of interest without a need for modifying the associated source code. These hooks can in turn invoke ARM calls for monitoring, e.g., measuring the response time, of the instrumented method.

Figure 15:
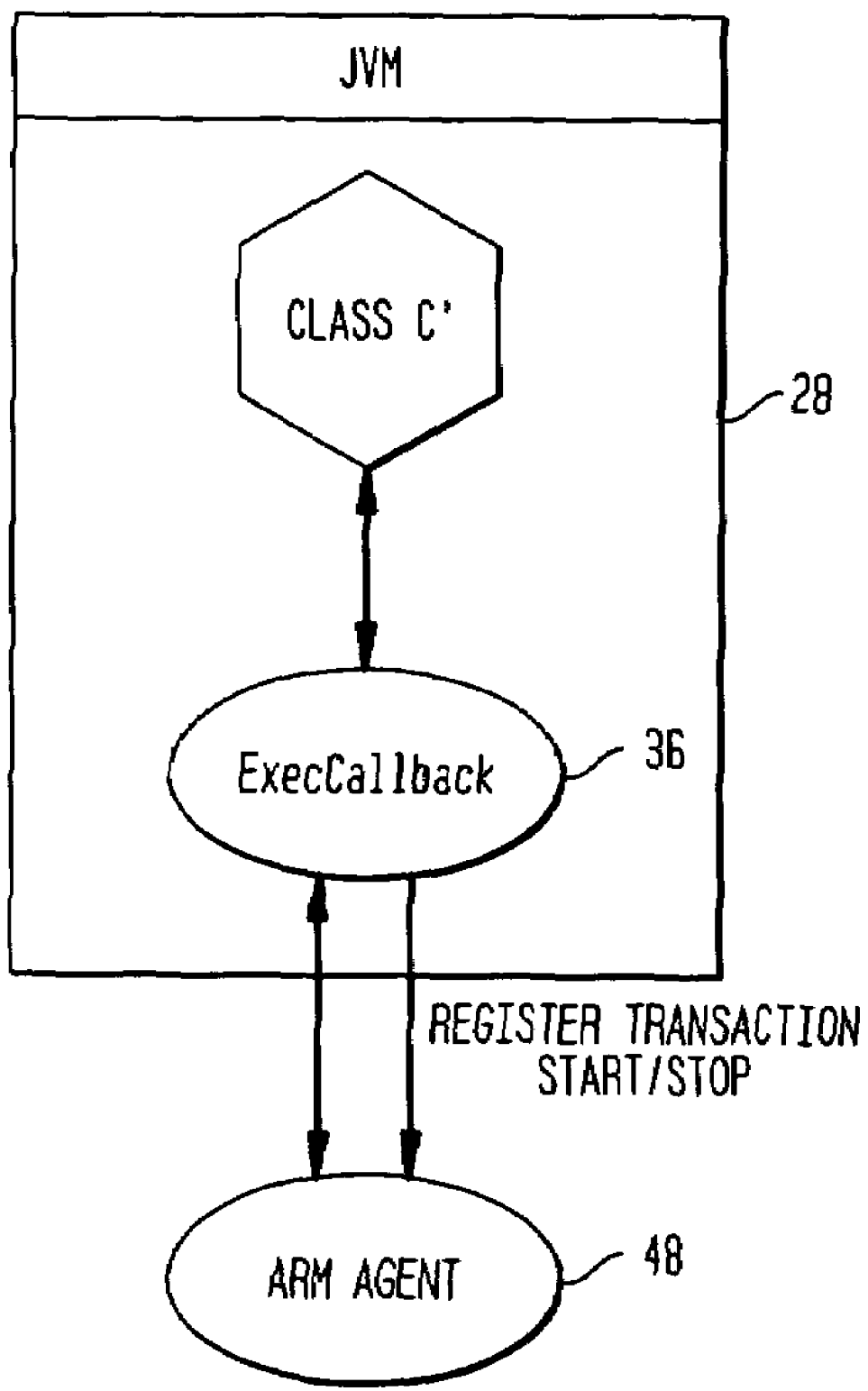
FIG. 15 schematically depicts the interaction of an instrumented class having hooks for communicating with an ARM agent for invoking ARM calls.

By way of example, with reference to FIG. 15, a method of a wrapper class C' that has been instrumented according to the teachings of the invention to include hooks for invoking ARM calls will be registered with an ARM agent 48 that implements the ARM protocol functionality. The registration of the instrumented method can be accomplished by utilizing a set of attributes, such as those described above, that would uniquely identify the instrumented method to the ARM agent 48. The instrumentation code, during execution of the instrumented method, will call the ExecCallback interface 36. In response to such a call, the ExecCallback interface 36 will communicate with the ARM agent 48 to generate an ARM transaction object. For example, immediately prior to starting an instrumented method or function in class C', the ExecCallBack interface can communicate with the ARM agent 48 to invoke an ARM start ( ) method that allows the ARM transaction object to save a start time marker (timestamp). Further, immediately after the transaction ends, an ARM stop ( ) method is invoked to save a stop time marker (timestamp). The start and step time markers can then be utilized to determine the response time of the instrumented method or function. More particularly, upon invocation of the start ( ) method, the ARM agent can initiate a transaction record corresponding to the transaction initiating the call, and upon invocation of the stop ( ) method, the ARM agent can complete the transaction record. As discussed in more detail below, the transaction record can be transmitted to a measurement server for analysis, presentation to a user, and/or storage in a database.

By way of example and only for further illustration and elucidation of the teachings of the invention for synthesizing ARM calls in a method of a software component of interest, consider the exemplary instrumentation of a doGet method of an exemplary servlet, herein referred to as "ExamplesServlet":

```
    private static ExecCallback $BIP$hook;
private static Object $BIP$ref__C;
private static Object $BIP$ref__M0;
...
private static void $BIP$installHook() {
    $BIP$hook = ExecFactory.getHook("ExamplesServlet", "bip 3.0.0");
    $BIP$ref__C = $BIP$hook.classLoadStart("ExamplesServlet", null, 1);
    $BIP$ref__M0 = $BIP$hook.defMethod($BIP$ref__C, "doGet(...)V;");
    $BIP$hook.classLoadEnd($BIP$ref__C);
}
```

-continued

```
...
public void doGet(HttpServletRequest request,
  HttpServletResponse response)
  throws IOException
{
  Object object;
  Throwable throwable;
  if ($BIP$hook == null)
      $BIP$installHook();
  object = $BIP$hook.methodEntry($BIP$ref_C, $BIP$ref_M0, this,
request, response);
  try{
      $BIP$doGet(request, response); // call original method
  }
  catch (Throwable throwable) {
      $BIP$hook.methodException(object, $BIP$ref_C, $BIP$ref_M0,
throwable);
      throw throwable;
  }
  if (object != null)
      $BIP$hook.methodExit(object, $BIP$ref_C, $BIP$ref_M0);
  return;
}
```

The above exemplary code illustrates that a static method, herein referred to as $BIP$installHook, is generated, and is called from the servlet class initialization code when the class is loaded before any other class initialization takes place. Alternatively, this method is called from conditional code at the start of each wrapper method. The installHook ( ) method first installs the hook object by calling a static hook factory method getHook. Then, using the installed hook object, it describes the class being loaded by a sequence of calls. The first hook call is to ClassLoadStart, and the last is to classLoadEnd. In between, there is a call to defMethod to generate a identifier for the instrumented doGet method. In preferred embodiments, an identifier associated with an instrumented method is generated once, rather than with each invocation of the method.

In the above exemplary instrumented doGet method, the original method doGet has been renamed as $BIP$doGet, but is otherwise unchanged. More specifically, the transaction initiated by the doGet method of the servlet is instrumented by providing methodEntry ( ) and methodExit ( ) calls to the ExecCallback interface immediately prior to the invocation of the doGet method and immediately after its termination. The body of the doGet method, however, remains unchanged. That is, the doGet method has been renamed and wrapped between calls to ExecCallback without being internally modified. Thus, the instrumentation is accomplished in a manner that is entirely transparent to the servlet. Further, exception handling is incorporated into the instrumented servlet to ensure proper error handling in case a platform on which the servlet is running does not provide access to an ARM agent.

The call to methodEntry( ) in the above exemplary instrumented servlet invokes the ARM agent to save a start timestamp associated with the resumption of the execution of the doGet method, and the call to methodExit( ) invokes the ARM agent to save a stop timestamp associated with the completion of the doGet method. In this manner, the ARM agent can generate a record indicating the response time of the doGet method, namely, the time elapsed between the start and the completion of this method.

Figure 16:
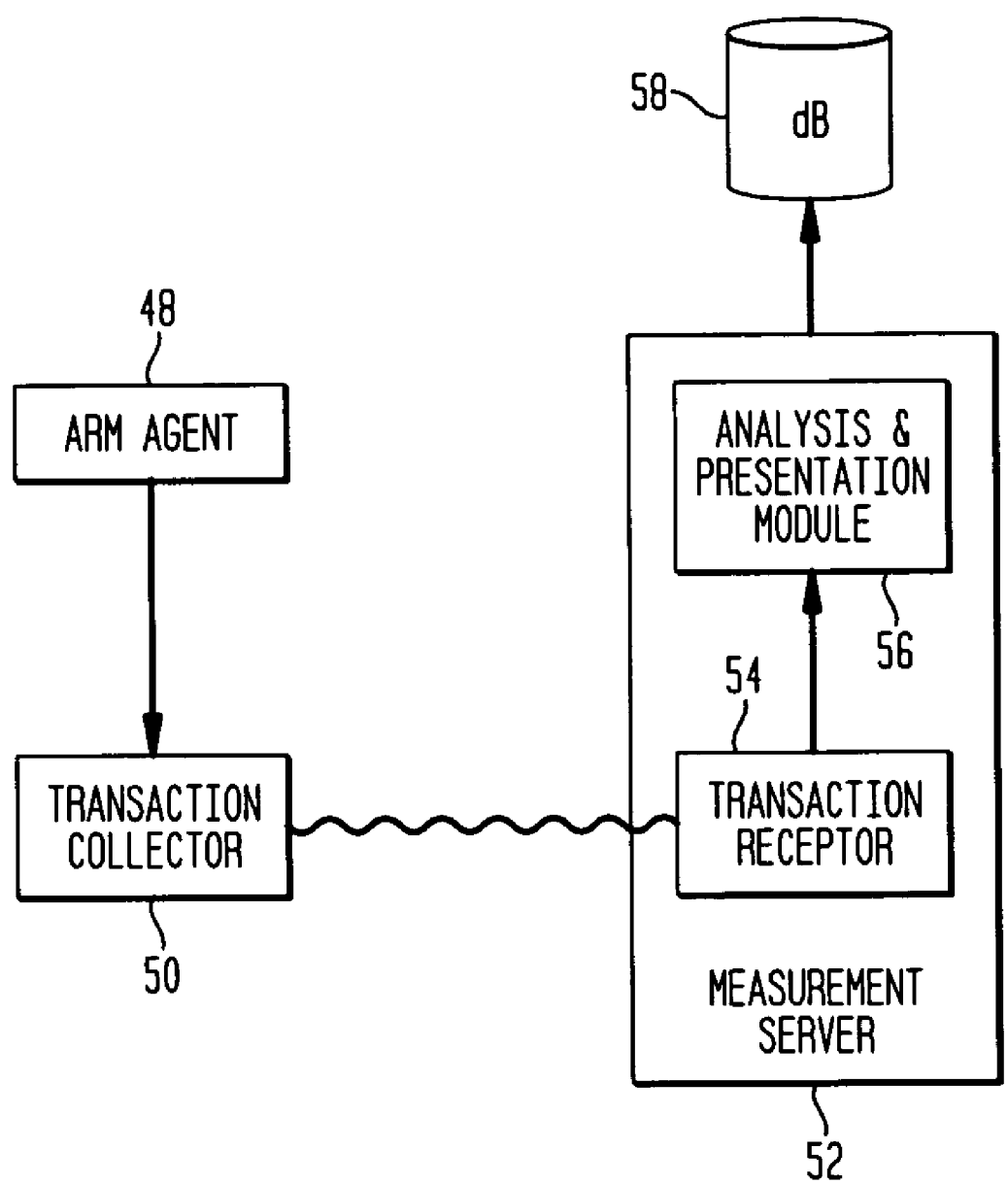
FIG. 16 schematically depicts an ARM agent in communication with a measurement server to transmitting records corresponding response time of transactions thereto.

With reference to FIG. 16, the ARM agent 48 can transmit data, e.g., in the form of a record, indicative of the response time of an instrumented transaction to a transaction collector 48 that in turn can transmit the data to a measurement and analysis server 52 to be analyzed and presented to a user. More specifically, a transaction receptor 54 can receive the data from the transaction collector 50, and can forward the data to an analysis and presentation module 56. The module 56 can analyze the data to determine the response time corresponding to the instrumented transaction, and can present the analyzed data in a variety of formats, described in more detail below, to a user. In addition, the analysis module 56 can store the data in a database 58.

Correlation via Thread Local Storage

In some cases, an instrumented transaction does not invoke, or is not invoked by, other transactions for processing a request. However, more commonly, an instrumented transaction monitored by a transaction monitoring agent of the invention can be a parent of a subsequent transaction or a child of a previous transaction. Hence, a chain of parent-child transactions can be present, each of which may be instrumented, for example, by insertion of ARM calls in its selected methods, as described above. In order to correlate the response time of a child transaction to that of its parent transaction, transaction monitoring systems of the invention employ correlators that can be passed from one transaction to another to ensure that the response times corresponding to related transactions can be cross correlated.

A description of an implementation according to the teachings of the invention for passing correlators from one J2EE transaction to another will follow, and a corresponding discussion relating to COM objects will be provided further below. The J2EE standard defines a request context available to each Web facing component. It, however, does not provide any mechanism for propagating application context between Java methods other than by parameter passing or global variables. A transaction monitoring system of the invention, however, provides a mechanism for propagation of such application context among related Java methods, as described below.

Figure 17:
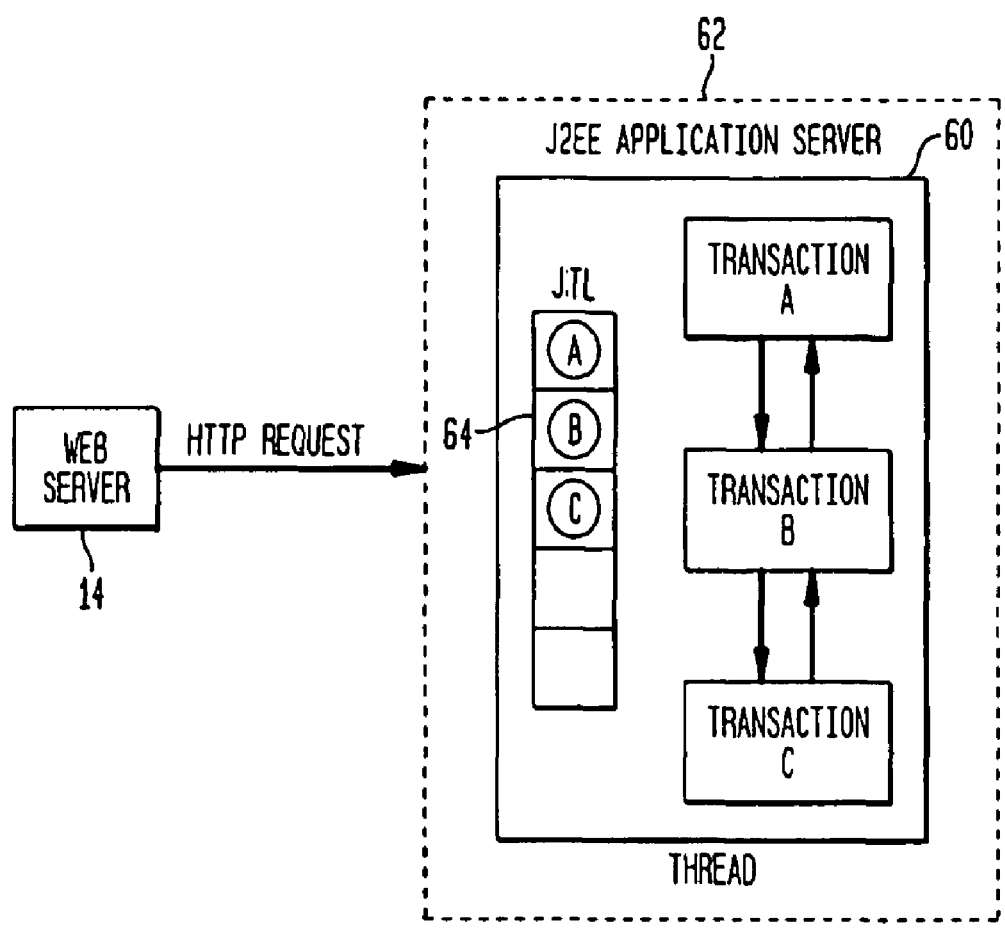
FIG. 17 schematically depicts storing correlators corresponding to transactions in a hierarchical child-parent transaction chain in Java thread local storage stack.

More particularly, a transaction monitoring system of the invention can convey context information, e.g., correlators, from one Java method invocation to another within a single thread of execution by storing this information in Java Thread Local storage (JTL). Moreover, context information corresponding to each level of interest in an application's dynamic chain of execution can be maintained by providing a "last-in-first-out" (LIFO) stack structure in the JTL, By way of example, with reference to FIG. 17, a logical thread of execution 60 can be initiated in an application server 62 in response to a request received from the web server 14. The logical thread 60 can include an initial instrumented transaction (herein referred to as Transaction A), which can be, for example, a _jpservice method of a JSP. Transaction A can in turn spawn a chain of child transactions. For example, the JSP can invoke a servlet, which can in turn invoke a JDBC transaction. In this exemplary illustration, Transaction A is assumed to be the top level transaction that spawns two instrumented transactions B and C within the same logical thread of execution. In other words, transactions A, B, C are related as parent-child transactions within the same logical thread.

Because Transaction A is instrumented in accordance with the teachings of the invention, it includes calls to the ARM agent 48 (FIGS. 5 and 6). In particular, the ARM agent 48 can be invoked by the ExecCallback interface 36 (FIGS. 2 and 3) at the start of the instrumented transaction A, as described above. Upon invocation, the ExecCallback interface 36 will access a JTL 64 associated with the logical thread 60 in order to obtain context information related to the Transaction A, and any other control information that may be needed to influence the behavior of subsequently invoked transactions, e.g., methods or software components. However, since Transaction A is the top level transaction in this exemplary transaction chain, the JTL 64 does not initially include such information. Accordingly, in preferred embodiments of the invention, the ExecCallback interface 36 will generate a correlator associated with Transaction A, and will store this correlator, herein referred to as correlator A, in one location of a stack associated with the JTL 64.

Figure 18:
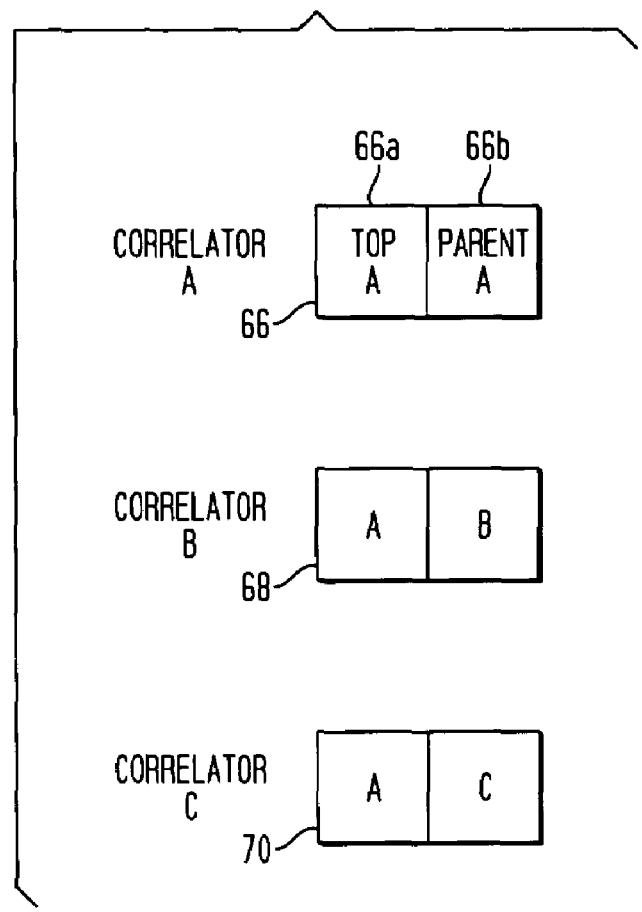
FIG. 18 depicts exemplary correlators for parent-child transactions shown in FIG. 17.

The correlator A, and subsequently generated correlators associated with Transactions B and C described below, can include a number of fields, each of which provides selected context information regarding the respective transaction. With reference to FIG. 18, in this exemplary embodiment, a correlator 66, e.g., the correlator A, includes a field 66a that identifies the top level transaction in a hierarchical transaction chain, and a second field 66b that identifies the parent of a current transaction.

In one embodiment of the invention, the correlator includes 96 bytes for storing context information associated with a transaction in a binary format. It should, however, be understood that the correlator can have other lengths or other formats.

For the top level correlator, the Top and Parent fields provide the same context information, namely, information related to the top level transaction. Alternatively, in this correlator, the parent transaction field can be a null field.

Referring again to FIG. 17, the exemplary Transaction A can invoke a child Transaction B that is also instrumented in accordance with the teachings of the invention. The correlator A stored in the JTL 64 will be accessed at an instrumentation point associated with Transaction B, and further, a new correlator, herein referred to as correlator B, will be generated to identify Transaction B. The exemplary correlator B, shown schematically as correlator 68 in FIG. 18, is stored in the stack associated with the JTL 64, and identifies Transaction A as the top level transaction and B as the parent transaction.

Similarly, the invocation of Transaction C as the child of Transaction B in the logical thread 64 will result in generation of a correlator C, which is schematically depicted in FIG. 18 as correlator 70. The exemplary correlator C identifies Transaction A as the top level transaction, and Transaction C as the parent transaction of Transaction C's children.

Once a transaction in a transaction chain is completed, its respective correlator is removed from the JTL stack. In this example, correlators C, B, and A are removed from the JTL stack as Transactions C, B, and A terminate. In other words, upon invocation of a transaction, a correlator corresponding to that transaction is pushed onto the JTL stack, and upon termination of that transaction, the correlator is popped from the JTL stack. In other words, in this exemplary embodiment, the clearance of the JTL stack is achieved based on a Last-in-First-Out (LIFO) protocol. In this example, once Transaction A is completed, the JTL stack is completely cleared. Hence, a new invocation of Transaction A, for example, in response to another HTTP request, will result in generation of a new correlator.

The passing of correlators from one instrumented transaction to another in a hierarchical transaction chain, as described above, allows the information obtained regarding these transactions to be cross correlated. This can advantageously provide additional levels of information, that is, a selected degree of granularity, regarding the performance, e.g., the time of completion, of the transactions measured at instrumentation points. For example, ARM calls associated with the exemplary Transaction A can provide information indicative of the response time of this transaction. This timing data regarding transaction A is formed at least in part by the response times associated with Transactions B and C, which are also measured by the instrumentation points corresponding to Transactions B and C. The correlators B and C indicate that Transaction A corresponds to the top level transaction of Transaction B and C. Hence, the measured response time corresponding to Transactions B and C can be related to Transaction A. This allows determining, for example, the fraction of the time required for completion of Transaction A that corresponds to the time required for completion of Transaction B, or Transaction C. This data may indicate, for example, that the response time of Transaction A is primarily determined by the response time associated with Transaction B. Hence, "bottlenecks", namely, transactions that are responsible for a major portion of the time needed for completion of a parent or a top level transaction, can be identified. Similarly, the correlator C can be utilized to relate any timing data associated with Transaction C to its parent transaction, namely, Transaction B.

Figure 19:
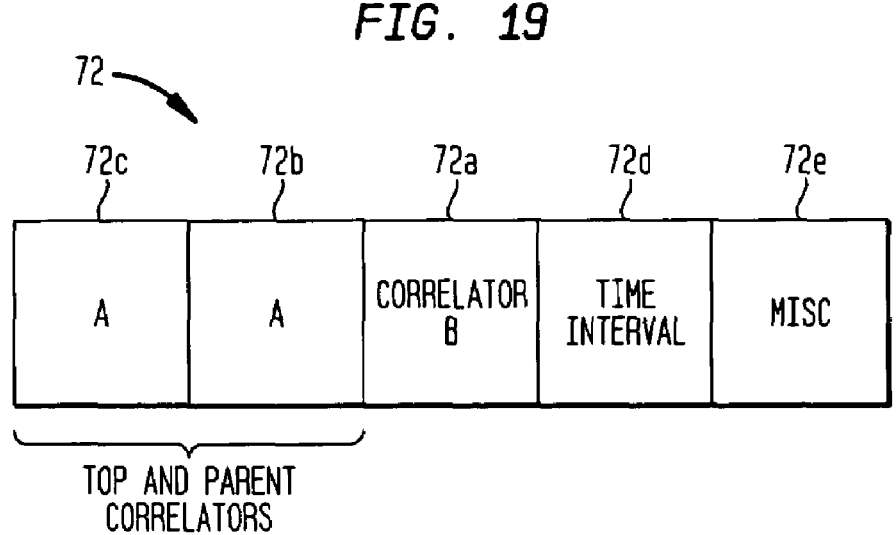
FIG. 19 depicts an exemplary record generated by an ARM agent for one of the transactions depicted in FIG. 17.

By way of example, FIG. 19 schematically depicts a record 72 that the ARM agent 48 (FIG. 15) can generate for the above Transaction B. The exemplary record 72 includes a field 72a that identifies the current transaction as Transaction B. Further, the ARM agent 48 can utilize the correlator 70 (FIG. 18) associated with Transaction B to identify, in fields 72b and 72c, the parent and the top level transactions associated with this transaction as Transaction A. In addition, the record 72 can include a field 72d that specifies the time interval from the start until the completion of Transaction B. The record 72 can also include other fields, such as miscellaneous field 72e, for providing other desired information. For example, the record 72 can include a field that is indicative of the transaction type, e.g., a field storing URL associated with an HTTP request, another field that identifies a transaction instance, and another field that identifies the platform from which an HTTP request is received. Those having ordinary skill in the art will appreciate that a correlator suitable for use in the practice of the invention can include information other than that recited above.

In the above example, the chain of transactions composed of Transactions A, B, and C was executed within a single logical thread. A hierarchical chain of transactions may, however, include transactions executing on different platforms, e.g., different application servers, and hence in different logical threads. In many embodiments of the invention, passing of correlators among such transactions executing on different platforms is accomplished by employing platform-specific technologies.

Web Server Instrumentation

The above discussion was substantially directed to instrumentation of Java software components running on an application server. In other aspects, the invention provides monitoring agents for deployment on web servers for defining a top level transaction originating from the web server and monitoring the time from start to completion associated with this transaction. By way of example, with reference to FIG. 20, a monitoring agent 74 according to the teachings of the invention deployed on the web server 14 can employ a variety of call backs provided by the web server, e.g., via one or more plug-in modules, during processing of an HTTP request received from the browser 12 to monitor the performance, e.g., time to completion, of a transaction initiated by the request. For example, the monitoring agent 74 can register with the web server to receive a call back upon receipt of an HTTP request by the web server from the browser. The HTTP request can be in the form of a string that includes the URL of the requested resource including other information embedded, for example, in a query string. A set of user supplied classification rules can be employed to modify the HTTP string, for example, by eliminating a query string, to generate a transaction name for a transaction initiated by the request.

Upon receiving a call-back from the web server indicating that a transaction has commenced, the monitoring agent 74 can register the transaction with the ARM agent 48, and invoke a start ( ) method of the ARM agent to generate a transaction record corresponding to this transaction and to save a start time marker.

In addition, the monitoring agent 74 can generate a top-level correlator associated with the transaction that can be passed to other related transactions that are invoked by the web server, for example, on the application server 16 that is in communication with the web server, for performing selected business logic required for servicing the top-level transaction. Each transaction invoked by the web server can in turn generate its own correlator, for example, by utilizing a correlator corresponding to the top-level transaction or a correlator corresponding to a parent transaction, in a manner described in detail above.

Upon completion of the transaction, the monitoring agent 74 can receive a call-back from the web server indicating that the transaction is completed. In response to this call-back, the monitoring agent can communicate with the ARM agent to invoke a stop ( ) method of the ARM agent for saving a stop time marker.

Figure 20:
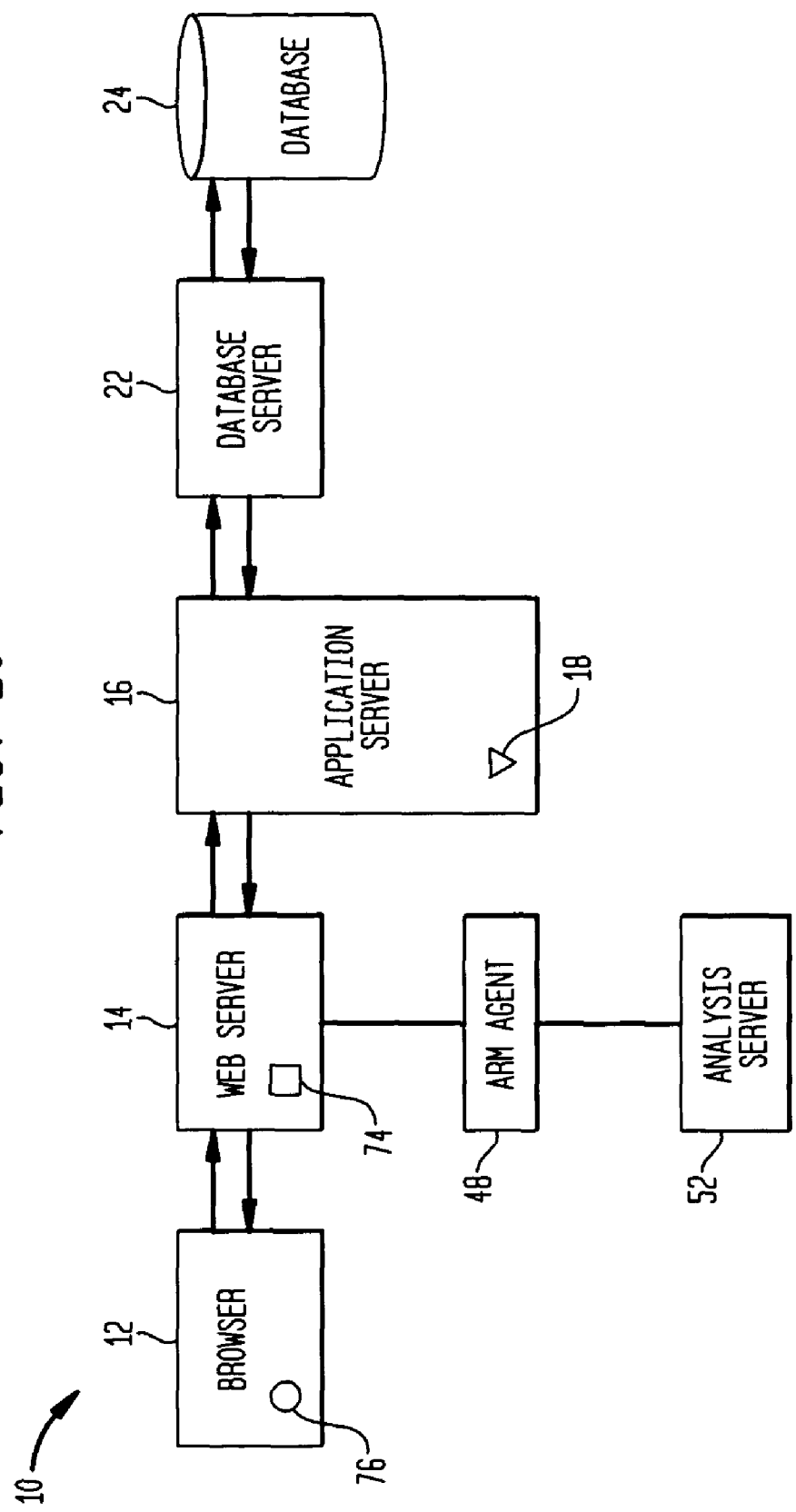
FIG. 20 illustrates an exemplary multi-tier web application architecture having, among other elements, a browser and a web server on which monitoring agents according to the teachings of the invention are deployed.

With continued reference to FIG. 20, the ARM agent 48 can transmit the record corresponding to the top-level transaction, including the start and stop time markers, to the measurement and analysis module 52. The analysis module 52 can utilize this information to calculate, and to present to a user, the time required for completion of the transaction. Further, the analysis module 52 can optionally save the transaction information to a database.

The various HTTP requests received by the server can be classified into different categories. For example, one category or class can include all requests having the same query string. In some embodiments of the invention, a single report that indicates an average time response associated with requests within a class is generated, rather than creating a separate report for each request within that class. In other words, the measured response time of all requests within a class are averaged, and this average value is reported as an approximate indicator of the response time associated with each request. This approach is particularly advantageous when the requests within a class are numerous.

In some embodiments of the invention, a web browser from which a transaction is initiated can also be instrumented to provide information regarding the time elapsed between initiation of a transaction by the browser and completion of that transaction.

Referring again to FIG. 20, a client monitor 76 of the invention, for example, a JavaScript script, can be deployed on the browser 12. Upon transmission of a request from the web browser to the web server, the script can inform the web server of the presence of a client monitor on the browser. In response, the web server can transmit the top-level correlator to the browser, for example, in the form of a cookie. Further, the client monitor, i.e., the script, can start a clock when the request is transmitted to the web browser. Upon being informed by the web server that the transaction is completed, the client monitor can stop the clock, thereby generating a measure of the time required for completion of the transaction. Moreover, the browser can communicate with the analysis and measurement server to send information regarding the time needed for completion of the top-level transaction, together with the top-level correlator, thereto.

In the above example, the chain of transactions composed of Transactions A, B, and C was executed within a single logical thread. In some other cases, however, the child of a parent transaction may execute in a different logical thread on the same or a different processor. For example, a hierarchical chain of transactions may include transactions executing on different platforms, e.g., different application servers, and hence in different logical threads.

The present invention can utilize a variety of techniques to pass correlators between such transactions that execute in different logical threads. In some embodiments, Java's distributed computing capabilities, such as Remote Method Invocation (RMI), can be utilized to pass correlators between separate processes. As is known in the art, RMI allows objects that are executing on different platforms, or in different processes on the same platform, to communicate via remote method calls.

For example, RMI running over Internet Inter-Orb Protocol (IIOP) can be utilized to pass correlators between different processes. In such implementations, a correlator associated with a parent transactions can be incorporated in a user extensible header of an IIOP message to be transferred to a child transaction executing in a different process. The child transaction can parse the message header to extract the parent correlator.

In other embodiments, Java Message Service (JMS), which support both point-to-point and publish/subscribe messaging models, can be employed to pass correlators between different processes. For example, a correlator can be incorporated in a properties header of a message that is transmitted from one instrumented transaction executing in one process to another instrumented transaction executing in a separate process.

In another aspect, the invention provides monitoring agents deployed on web and application servers for monitoring the response time of one or more methods invoked in a web transaction in a multi-tier web transaction processing environment in which COM objects are utilized for performing, for example, business logic required for servicing the transactions. As discussed in more detail below, such a transaction monitoring agent of the invention can intercept a request from a software component for creating a COM object. Upon interception of the request, the monitoring agent generates a COM object, herein referred to as a wrapper object, that can invoke methods of interest in the COM object whose creation was requested, herein also referred to as the wrapped object. The requesting software component, herein also referred to as a client, can be, for example, another COM object. The monitoring agent provides the client with a pointer that refers to the wrapper object, rather than the wrapped object, such that any request for invoking a method of the wrapped object would be implemented, in a manner described below, via the wrapper object. The wrapper object can further include instrumentation code that can cause an ARM agent, such as the one described above, to determine the response time of selected invoked methods of the wrapped object.

Figure 21:
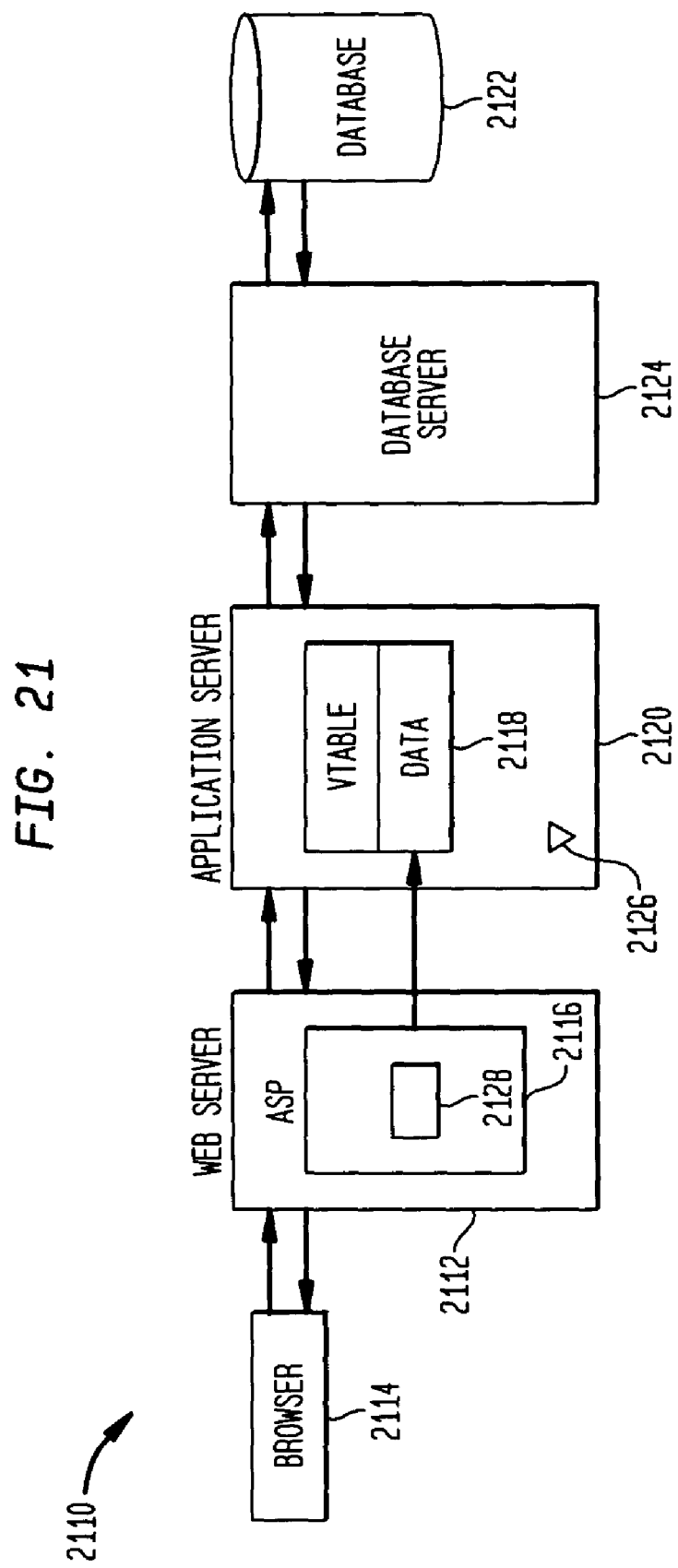
FIG. 21 schematically illustrates a multi-tier web architecture in which a web server, upon the receipt of an HTTP request from a browser, generates an Active Server Page.

By way of example, FIG. 21 illustrates a multi-tier web architecture 2110 in which a web server 2112, upon the receipt of an HTTP request from a browser 2114, generates an Active Server Page 2116. The generation of ASP may require creation of a COM object 2118 on an application server 2120 to perform a selected business logic, for example, retrieving data from a database 2122 via a database server 2124. The exemplary application server 2120 further includes a monitoring agent 2126 according to the teachings of the invention that can intercept the request from the web server 2112 and can generate a wrapper object corresponding to the COM object 2118 in a manner described below. The wrapper object masquerades as the COM object 2118 to interact with the requesting component, for example, a proxy object 2128.

Figure 22:
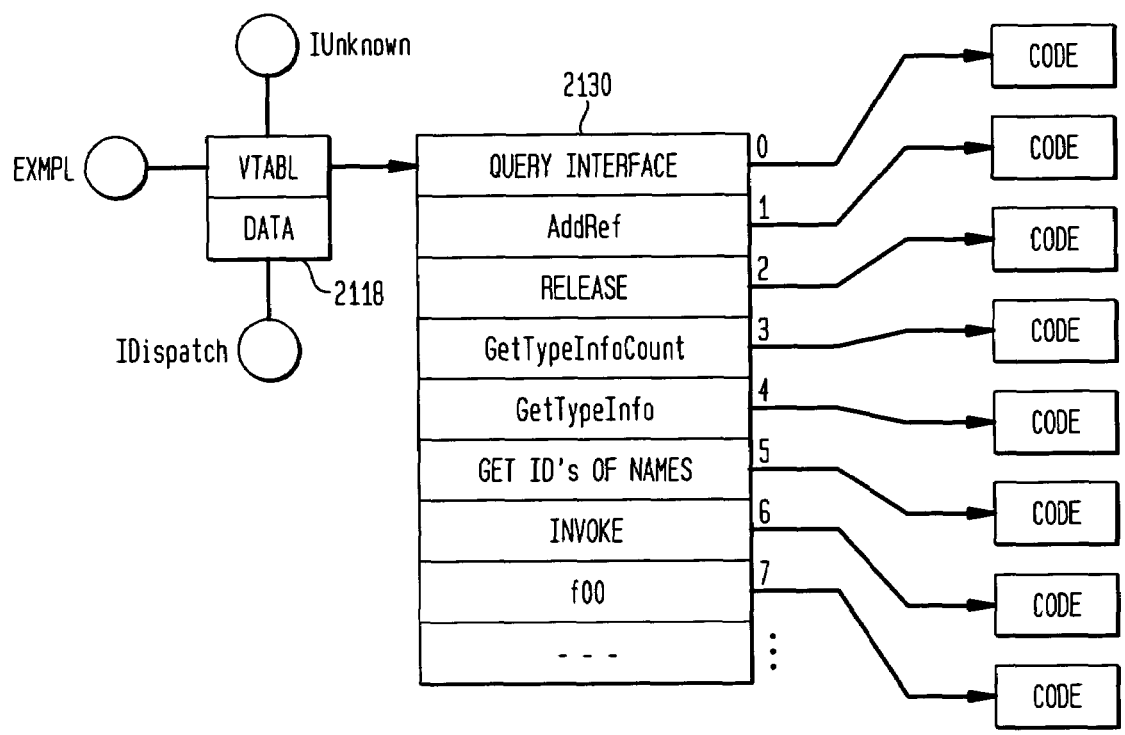
FIG. 22 schematically depicts an exemplary Common Object Model (COM) object implementing three interfaces.

With reference to FIG. 22, in this example, the exemplary COM object 2118 implements three interfaces, IUknown, IDispatch, and a third exemplary interface that is herein referred to as Exmple interface. It should be understood that these interfaces are presented only for illustration and elucidation of the salient features of this aspect of the invention, and are not intended to be limiting of the type and the number of interfaces that a COM object can implement. As known in the art, the exemplary COM object 2118 includes a pointer, commonly referred to as vtable, that refers to a representation 2130 of its implemented interfaces. The representation 2130, herein also referred to as interface 2130 with the understanding that it can represent more than one implemented interface of the object 2118, includes a plurality of virtual functions associated with the three interfaces of the object 2118. Each virtual function is a pointer to a code that includes instructions for executing that function. The functions numbered 0, 1, and 2 are common to the three interfaces while the functions numbered 3-6 are associated with the IDispatch interface. The Exmple interface includes a function "foo", numbered as function 7, and can further include other functions (not shown).

Figure 23:
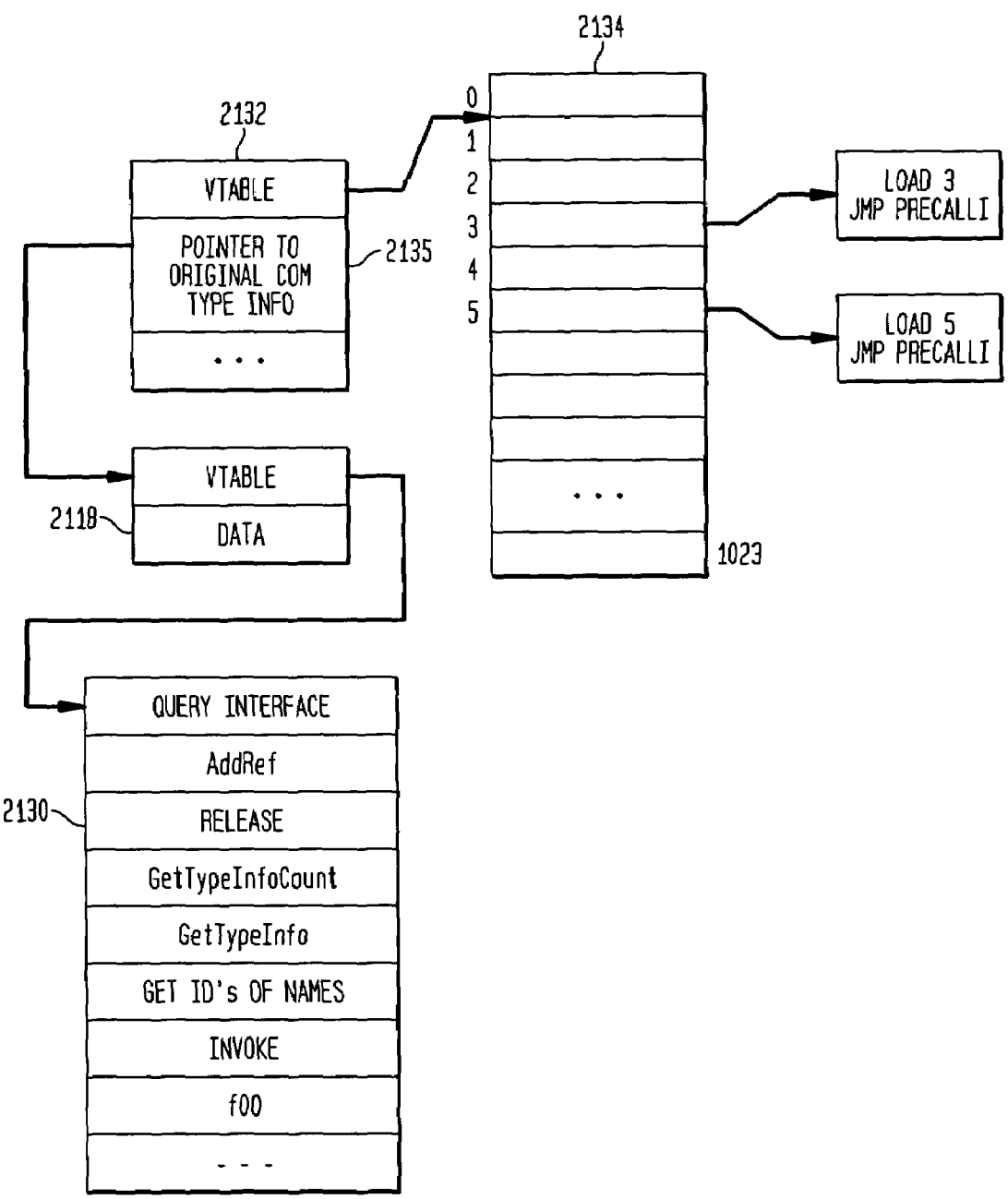
FIG. 23 schematically depicts a wrapper COM object corresponding to the COM object of FIG. 22.

With reference to FIGS. 21 and 23, the monitoring agent 2126, upon interception of a request for creation of the object 2118, generates a wrapper object 2132 corresponding to the object 2118. The wrapper object 2132 implements a universal interface 2134, common to all wrapper objects generated in accordance with the teachings of the invention, that includes a plurality of virtual functions, each of which refers to a set of instructions for implementing that function. In this example, the universal interface 2134 includes 1024 virtual functions, a size selected based on the observation that an interface of a COM object to be wrapped is unlikely to include more than 1024 entries. However, those having ordinary skill in the art will appreciate that other sizes can be employed for a universal interface in accordance with the teachings of the invention.

The instructions associated with each of the virtual functions of the universal interface 2134 includes a load instruction for loading a number corresponding to the number of that function in the universal interface and a jump instruction for jumping to instructions corresponding to a method, herein referred to as PrecallInterceptor (PrecallI), which is described in more detail below. For example, exemplary pseudocodes corresponding to functions 3 and 7 load numbers 3 and 7, respectively, and subsequently jump to the PrecallI method. As discussed in more detail below, the PrecallI method can then call the original function by reference to the interface representation of the original object.

More particularly, with continued reference to FIG. 23, the wrapper object 2132 further includes a pointer 2136 pointing to the original (wrapped) object 2118, and a data structure, herein referred to as TypeInfo, that stores information regarding all methods of an interface of the original object 2118. For example, the Type Info data structure can include the type and the number of arguments of each of these methods. The TypeInfo is generated the first time the interface is called, and can be utilized for future calls to the interface. Further, the methods of the interface are registered with the ARM agent as ARM transaction types the first time the interface is called.

By way of example, a client may invoke the foo method associated with the Exmple interface of the object 2118. The request for the invocation of the foo method, namely, function number 7 in the Exmple interface associated with the COM object 2118, is directed to the wrapper object 2132 because, as discussed above, the client is provided with a pointer that points to the wrapper object 2132 rather than the original object 2118. Because the virtual function associated with the foo method is entry number 7 in the interface 2130 associated with the object 2118, the wrapper object invokes the virtual function corresponding to the entry number 7 in the universal interface 2134 that points to the code that invokes the PreCallI method and passes 7 as the method number thereto. The PreCallI method can determine the type and the size of each argument of method number 7, namely, the foo method, via the TypeInfo data structure of the wrapper object 2132. Hence, the PrecallI function can determine the number of bytes on the client's stack that correspond to the arguments of the foo method. The PreCallI can utilize this information to call the foo method by employing the pointer in the wrapper object to the original object to access the vtable and utilize the virtual function associated with entry number 7 in the interface of the original object to discover the code for the foo method.

Figures 24, 25:
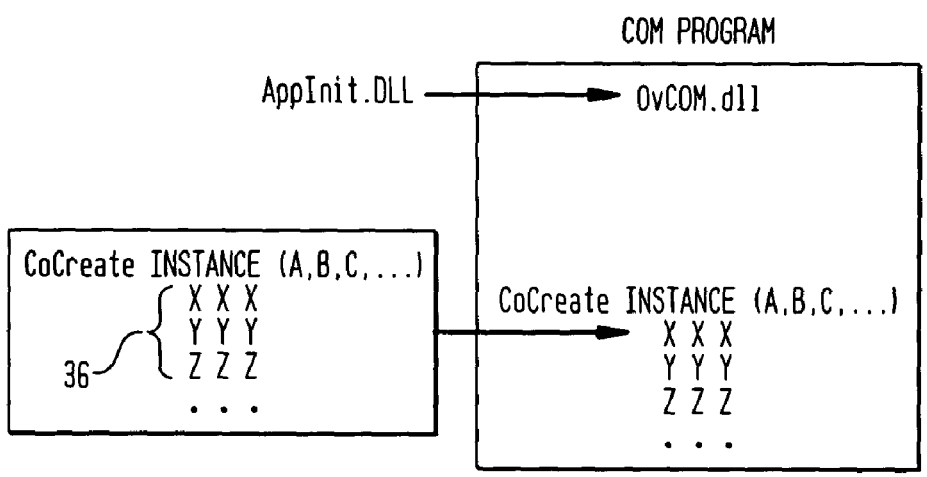
FIG. 24 an exemplary method utilized by the wrapper COM object of FIG. 23 to call invoke ARM calls and to call the original method of the wrapped object.
FIG. 25 schematically depicts utilizing a hook to load a selected dynamic link library upon invocation of selected system functions by an object to be wrapped.

More specifically, with reference to FIG. 24, as shown in an exemplary pseudocode associated with the PreCallI function, initially the number and the type of arguments associated with the method number 7, namely, the foo method, are determined. Prior to executing the foo method, a call is made to an ARM agent, for example, the ARM agent 48 described above, to generate a transaction record including a start time marker associated with the foo method. The instructions associated with the foo method are then executed. Upon completion of the execution of the foo method, another call is made to the ARM agent to generate a stop time marker associated with the foo method. The start and stop time markers can then be employed, for example, by a measurement and analysis module (e.g., module 52 of FIG. 6 above) that is in communication with the ARM agent to calculate a response time associated with the execution of the foo method.

The foo method can return a value to the client via an address pointer referring to the address of the return value. The return value can be in some cases another COM object. In such cases, the return COM object can be accessed via its address pointer, and a wrapper COM object corresponding to the return COM object can be generated in a manner described above.

In some embodiments of the invention, all COM objects requested by a client are wrapped to generate corresponding wrapper objects. In some other embodiments of the invention, a pre-defined policy is utilized to wrap selected COM objects. Such a policy can be stored, for example, in the form of a table in the system's registry. In some embodiments, such policy tables can be indexed by interface ID's (IID), class ID's, or program ID's to identify, for example, COM interfaces for which wrapping is not required. For example, a COM object may not be wrapped if there is a risk that the corresponding wrapper object may cause the system to behave in an unstable fashion. In general, a proxy object, a COM object that belongs to an MTS (Microsoft transaction server) package, or a COM+ object are wrapped.

As discussed above, a transaction monitoring agent of the invention intercepts a request from a client for generating a COM object, and in response, it creates a wrapper object corresponding to the COM object for which the request was made. In preferred embodiments of the invention, the interception of the request is performed by "hooking" of appropriate system functions that are included in the system's dynamic link library (dll), e.g., Ole32.dll or mtxex.dll. The term "hooking" or "patching" of a system function, as used herein, refers to inserting one or more code segments in a code associated with the system function in order to cause performance of a selected task, for example, generating a wrapper object. The system functions that are typically hooked by a method of invention for generating COM wrapper objects include, e.g., CoInitialize, CoInitializeEx, OleInitialize, CoAddRefServerProcess, CoCopyProxy, CoCreateInstance, CoCreateInstanceEx, CoGetCallContext, CoGetClassObject, CoGetInstanceFromFile, CoGetInstanceFromIStorage, CoGetInterfaceAndReleaseStream, GetObjectContext (NT only), CoGetObjectContext (W2K only), CoImpersonateClient, CoInitializeSecurity, CoMarshalInterThreadInterfaceInStream, CoMarshalInterface, CoRegisterClassObject, CoReleaseServerProcess, CoRevertToSelf, CoRevokeClassObject, CoSetProxyBlanket, CoUninitialize, CoUnmarshalInterface, OleUninitialize By way of example, consider the invocation of the CoCreateInstance, supplied by Ole32.dll, by a COM program run by a client for generating a COM object. FIG. 25 schematically depicts that CoCreateInstance includes binary code 2136 that can be loaded into memory for execution. The system provides a hook, namely, a string designated AppInit_dll stored in the system registry, in the context of any COM program that employs user32.dll dynamic link library. This hook can be utilized by a monitoring agent of the invention for hooking the CoCreateInstance function as described below. For example, a monitoring agent of the invention can write the name of a dynamic link library, herein referred to as OvCom.dll, provided by the monitoring agent and stored in the required system directory, to the AppInit_DLL string. This causes the system to load OvCom.dll in the COM program utilizing the CoCreateInstance, as shown schematically in FIG. 25. The OvCom.dll executes prior to the execution of CoCreateInstance to patch the code 2136 associated with CoCreateInstance in the following manner.

Figures 26, 27:
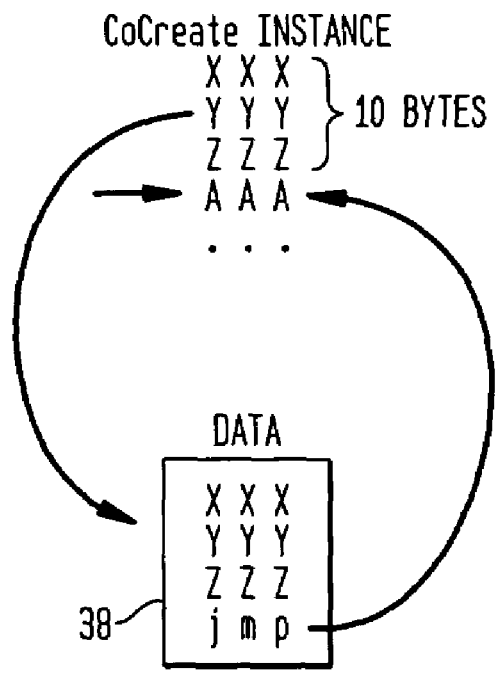
FIG. 26 schematically depicts patching the code of a selected system function, namely, CoCreateInstance by inserting a jump instruction therein.
FIG. 27 schematically depicts instructions in a function provided by the loaded dynamic link library of FIG. 25 for generating a wrapper object.

With reference to FIG. 26, in this exemplary embodiment, 10 initial bytes of the code associated with the CoCreateInstance function are replaced with a jump (jmp) instruction to a function supplied by the OvCom.dll, herein, referred to OVTACoCreateInstance, schematically depicted in FIG. 27. The 10 bytes of the CoCreateInstance function that have been replaced can include all and/or part of each of a plurality of instructions. Hence, prior to overwriting the initial 10 bytes by the jump instruction, those instructions of the CoCreateInstance function that are wholly or partially included in these 10 bytes, are copied to a data area 2138. Further, a jump instruction is included in the data area 2138, after the copied instructions, that refers to an instruction in the CoCreateInstance function immediately following the last copied instruction. For example, in this exemplary illustration, the XXX, YYY, and ZZZ instructions include 12 bytes. Hence, prior to inserting the jump instruction to OVTACoCreateInstance function, these instructions are copied to the data area 2138. Further, the a jmp instruction is included after the copied instructions in the data area 2138 to refer back to the CoCreateInstance function, or more specifically, to the instruction AAA following the ZZZ instrunction in the CoCreateInstance function.

FIG. 27 provides an exemplary illustration of OVTACoCreateInstance function to which the same parameters as those associated with the CoCreateInstance, namely, parameters A, B, and C, are passed. The OVTACoCreateInstance function calls the CoCreateInstance, via instructions stored in the data area 2138, to generate a COM object, requested by the client, referenced, for example, by parameter B. It accesses the generated COM object via parameter B, and wraps the COM object to generate a wrapper object, such as those described above. Subsequently, it sets parameter B to refer to the wrapper object, and returns B to the original caller, namely, the client that requested the COM object.

As discussed above, patching of the code associated with the CoCreateInstance function requires insertion of a jump instruction in the code by overwriting a selected number of bytes, for example, ten bytes. Prior to the insertion of the jump instruction, those instructions in the original code associated with the CoCreateInstance that will be corrupted by insertion of the jump instruction are copied to an allocated data area. However, the number of bytes that need to be copied may be more than the number of bytes associated with the inserted jump instruction because the inserted bytes may not necessarily terminate at a boundary between two instructions. For example, the last byte associated with a 10 byte long inserted jump instruction may overwrite the first byte of a three-byte instruction of the original code associated with the CoCreatInstance function. In such a case, 12 bytes, rather than 10, need to be copied to the data area. Hence, in preferred embodiments, a monitoring agent of the invention decodes the bytes of the original code of the CoCreateInstance to be overwritten to determine the instructions to which they correspond in order to determine the number of bytes that will be copied to the data area. Such a decoding of the bytes is of particular value in cases in which the system's processor architecture provides instructions with varying sizes.

In one embodiment of the invention, the decoding of the bytes can be accomplished by generating a table having 256 entries, each of which corresponds to one value of a single byte. The first byte of the instruction set is then checked against the table. The table may then directly indicate the length of an instruction associated with that byte, or may provide a reference to an algorithm that can determine the instruction length based on the format of the instruction set of a processor of interest. The determined length can then be utilized to access the opcode of the next instructions, and the above procedure can be iterated to determine the lengths of each of a minimum number of instructions whose collective length is at least a selected number of bytes, for example, 10 bytes in this exemplary embodiment.

Figure 28:
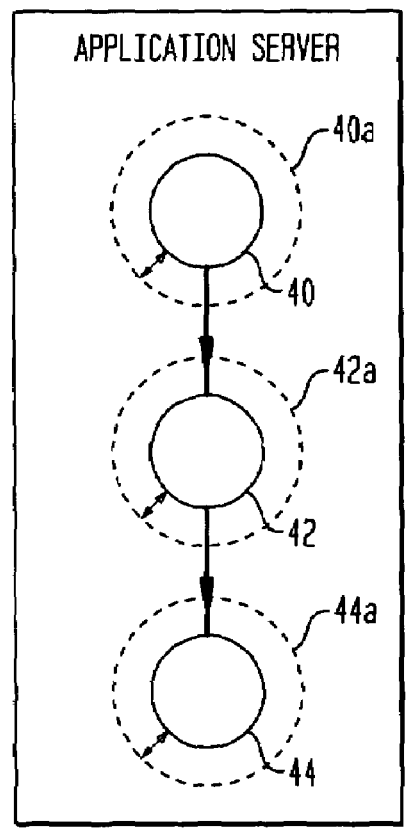
FIG. 28 depicts a chain of COM objects in a parent-child hierarchical relation.

In some cases, a method of a COM object invoked to perform a selected business logic may invoke methods of other COM objects within a single thread of execution to request performance of selected tasks, e.g., obtaining data from a database. Hence, a hierarchical chain of dependency among a plurality of COM objects can be created in which each COM object is a parent and/or a child of another COM object. For example, with reference to FIG. 28, an exemplary COM object 2140, which is instrumented by a wrapper object 2140a, can spawn a child COM object 2142, which is instrumented by a wrapper object 2142a. The COM object 2142 in turn invokes, via its wrapper object 2142a, another COM object 2144, which is also instrumented by a wrapper object 2144a.

In this exemplary embodiment of the invention, context information in the form of correlators is passed among the chain of objects 2140a-2144a by storing the correlators in a thread local storage (TLS) associated with the single thread of execution. Initially, the object 40a accesses the TLS to obtain a correlator. However, because in this exemplary chain of transactions, object 2140a represents a top level transaction, initially no correlator is present in the TLS. When the object 2140a is invoked in response to a web-based application, object 2140a can employ a cookie transmitted by the application as its parent correlator. In addition, upon invocation of the start ( ) method of the ARM agent, a correlator associated with the object 2140a will be generated and stored in the TLS. Subsequently, the object 2142a, upon accessing the TLS, will obtain this stored correlator and will use it as its parent correlator. In addition, a new correlator corresponding to the instrumented transaction associated with the object 2142a will be generated, for example, upon invocation of the start( ) method of the ARM agent. The correlator corresponding to the object 2142a will be stored in another location of a stack associated with the thread local storage. Similarly, invocation of the object 2144a will result in generation of a new correlator that will be also stored in the TLS stack. In general, the correlators are stored in the stack based on a Last-in-First-Out (LIFO) protocol. As each transaction is completed, its corresponding correlator is popped from the stack.

Figure 29:
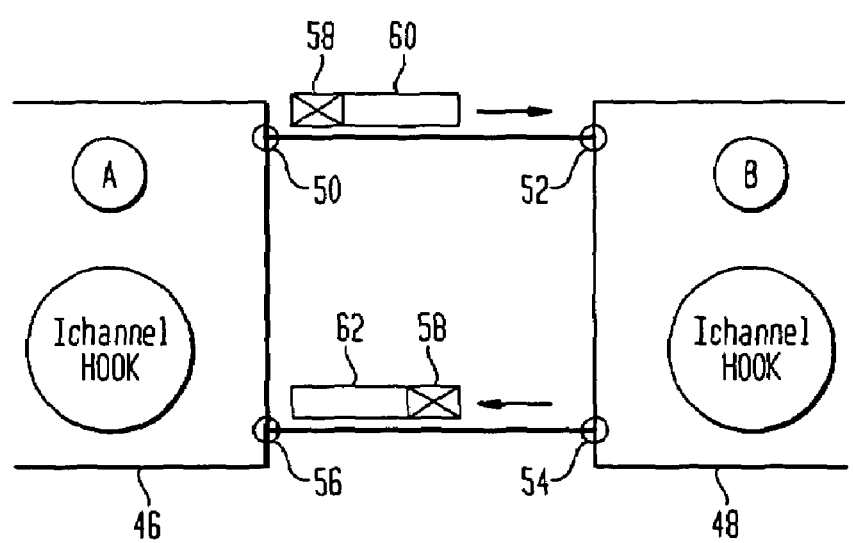
FIG. 29 schematically depicts passing correlators among COM objects operating on different platforms.

In some cases, an instrumented COM object may invoke another instrumented COM object executing in a different process either on the same platform or on a different platform. For example, with reference to FIG. 29, a COM object A executing on a platform 2146 can call another COM object executing on a separate platform 2148. The passing of a correlator between the object A and the object B can be accomplished by utilizing a hooking mechanism as described below. For example, an IChannelhook object can be generated on each of the platforms 2146 and 2148 to intercept an outgoing call 2150, an incoming call 2152, an outgoing return call 2154, and an incoming return call 2156. The IChannelhook object can include four methods, each of which performs tasks associated with one of these interceptions. For example, the IChannelhook object executing on the platform 2146 can register, for example, via CoRegisterChannelHook, to intercept the outgoing call 2150 from the object A to the object B.

Upon interception of the outgoing call 2150, a correlator 2158 associated with the object A can be added to a data payload 2160 that is transmitted from the object A to the object B. The IChannelHook object executing on the platform 2148 will inspect the incoming payload at the incoming call interception point 2152, and will extract the correlator 2158, if present in the payload. The object B will utilize this correlator as its parent correlator, and it will further generate its own correlator. Upon completion of the transaction associated with the object B, the correlator associated with B will be popped from the stack, and data generated by the object B in response to the call from object A will be sent back to the object A. The IChannelhook object executing on the platform 2148 will intercept the return payload at the outgoing return call point 2154, and will add the original correlator 2158 to the return payload. In some alternative embodiments of the invention, the original correlator 2158 is not added to the return payload.

The present application is related to the following commonly owned U.S. patent applications, all of which are hereby incorporated by reference herein in their entirety: U.S. patent application Ser. No. 10/640,620 entitled "USING INTERCEPTORS AND OUT-OF-BAND DATA TO MONITOR THE PERFORMANCE OF JAVA 2 ENTERPRISE EDITION (J2EE) APPLICATIONS," filed on Aug. 12, 2003; U.S. patent application Ser. No. 10/640,619 entitled "USE OF THREAD-LOCAL STORAGE TO PROPAGATE APPLICATION CONTEXT IN JAVA 2 ENTERPRISE EDITION (J2EE) APPLICATIONS," filed on Aug. 12, 2003 U.S. patent application Ser. No. 10/640,620 entitled "USING INTERCEPTORS AND OUT-OF-BAND DATA TO MONITOR THE PERFORMANCE OF JAVA 2 ENTERPRISING EDITION (J2EE) APPLICATIONS," filed on Aug. 12, 2003 and U.S. patent application Ser. No. 10/640,623 entitled "SYNTHESIZING APPLICATION RESPONSE MEASUREMENT (ARM) INSTRUMENTATION," filed on Aug. 12, 2003.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of instrumenting a Common Object Model (COM) object invoked by a client for performing a selected business logic, comprising:
   intercepting a request from the client for creating said COM object,
   generating a wrapper object corresponding to said requested COM object, said wrapper object implementing a universal interface having a plurality of virtual functions each indexed by a number corresponding to an index number of a method associated with an interface of said requested COM object,
   providing said client with a reference pointer to said wrapper COM object,
   upon invocation of a method associated with an interface of the requested COM object by the client, invoking a virtual function of said universal interface of the wrapper object indexed by a number corresponding to an index number of said invoked method,
   wherein said invoked virtual function references instructions for saving a start time marker, executing instructions corresponding to said invoked method, and saving a stop time marker upon completion of execution of said instructions associated with the invoked method.

2. The method of claim 1, further comprising registering said invoked method with an Application Response Measurement (ARM) agent upon invocation of said method by the client.

3. The method of claim 2, wherein saving a start time marker comprises invoking said ARM agent for generating a record for a transaction corresponding to invocation of said method of the requested COM object.

4. The method claim 3, wherein saving a stop time marker comprises invoking said ARM agent to generate said stop time marker.

5. The method of claim 1, wherein said wrapper COM object comprises a data structure for storing a number of arguments and a type of each argument associated with each method of said requested COM object.

6. The method of claim 1, wherein said wrapper object comprises a reference pointer for referring to said universal interface.

7. The method of claim 1, further comprising
   defining a policy that indicates whether to perform said step of generating a wrapper COM object corresponding to said requested COM object; and
   determining whether to perform said step of generating a wrapper COM object using said policy.

8. The method of claim 7, wherein said policy identifies a requested proxy object, a requested COM object belonging to an MTS package, and a requested COM+ object for wrapping.

9. The method of claim 7, further comprising
   storing said policy in a tabular format in a registry of a system on which said COM objects are executed.

10. The method of claim 1, wherein the step of intercepting a request comprises patching code associated with one or more selected system functions.

11. The method of claim 10, wherein said system functions are provided in a dynamic link library.

12. The method of claim 10, further comprising
for each of said selected system functions, utilizing a hook associated therewith to refer to a program for patching said system function.

13. The method of claim 12, wherein said hook comprises a designated string stored in system registry.

14. The method of claim 13, wherein said patching of the system function comprises
replacing selected bytes in a code corresponding to said system function with a jump instruction to a code for creating said requested COM object and generating said wrapper object.

15. The method of claim 14, further comprising
copying instructions in said system function code corrupted by said inserted jump instruction to an allocated data area.

16. The method of claim 15, further comprising
decoding said selected bytes prior to their replacement by said jump instruction to determine a total number of bytes corresponding to instructions corrupted by said inserted jump instruction.

17. A computer system having memory storing instructions for monitoring instrumenting a response time of a transaction performed by one or more Common Object Model (COM) objects invoked by a client and executing on one or more platforms, comprising:
one or more monitoring agents deployed on selected ones of said platforms, each monitoring agent configured to intercept intercepting a request for creating at least one of said COM objects generating and to generate a wrapper object corresponding to said requested COM object, wherein said wrapper object implements implementing a universal interface having a plurality of virtual functions each indexed by a number corresponding to an index number of a method associated with an interface of said requested COM object, said monitoring agent further configured to provide the client with a pointer to said wrapper object,
wherein upon invocation of a method associated with an interface of the requested COM object, a virtual function of said universal interface of said wrapper object, indexed by a number corresponding to an index number of said invoked method, is invoked,
wherein said invoked virtual function references instructions for instrumenting said invoked method.

18. The system of claim 17, further comprising
an Application Response Measurement (ARM) agent in communication with said monitoring agent.

19. The system of claim 18, wherein each of said virtual functions refers to a code having instructions for invoking said ARM agent prior to execution of an invoked method of a wrapped COM object to save a start time marker, executing said invoked method, and invoking said ARM agent subsequent to completion of execution of said invoked method to save a stop time marker.

20. A computer readable medium storing instructions for performing a method of instrumenting a Common Object Model (COM) object invoked by a client, comprising:
intercepting a request from the client for creating said COM object,
generating a wrapper object corresponding to said requested COM object, said wrapper object implementing a universal interface having a plurality of virtual functions each indexed by a number corresponding to an index number of a method associated with an interface of said requested COM object,
providing said client with a reference pointer to said wrapper COM object, and
upon invocation of a method associated with an interface of the requested COM object, invoking a virtual function of said universal interface of the wrapper object indexed by a number corresponding to an index number of said invoked method,
wherein said invoked virtual function references instructions for instrumenting said invoked method.

* * * * *

UNITED STATES PATENT AND TRADEMARK OFFICE
CERTIFICATE OF CORRECTION

PATENT NO. : 7,437,734 B2
APPLICATION NO. : 10/640625
DATED : October 14, 2008
INVENTOR(S) : Jeffrey Rees et al.

It is certified that error appears in the above-identified patent and that said Letters Patent is hereby corrected as shown below:

In column 1, line 11, delete "MQNITOR" and insert -- MONITOR --, therefor.

In column 4, line 62, delete "6" and insert -- 16 --, therefor.

In column 8, line 12, delete "execCaliback" and insert -- execCallback --, therefor.

In column 10, lines 3-4, delete "hoodMethod" and insert -- hookMethod --, therefor.

In column 15, line 28, delete "hoodMethod" and insert -- hookMethod --, therefor.

In column 31, lines 62-66, delete "U.S. patent application Ser. No. 10/640,620 entitled "USING INTERCEPTORS AND OUT-OF-BAND DATA TO MONITOR THE PERFORMANCE OF JAVA 2 ENTERPRISING EDITION (J2EE) APPLICATIONS,"" and insert -- ; U.S. Patent Application Ser. No. 10/640,626 entitled "INSTRUMENTING JAVA CODE BY MODIFYING BYTECODES," --, therefor.

In column 33, line 34, in Claim 17, after "implements" delete "implementing".

Signed and Sealed this

Eleventh Day of August, 2009

David J. Kappos
*Director of the United States Patent and Trademark Office*